US011188942B2

(12) United States Patent
Omori et al.

(10) Patent No.: US 11,188,942 B2
(45) Date of Patent: Nov. 30, 2021

(54) COMPUTER SYSTEM, GAME SYSTEM, AND GAME DEVICE

(71) Applicant: BANDAI NAMCO Entertainment Inc., Tokyo (JP)

(72) Inventors: Daisuke Omori, Tokyo (JP); Makoto Kikuchi, Tokyo (JP); Yuki Matsuba, Kawasaki (JP); Masayuki Oda, Fujisawa (JP); Akio Onda, Warabi (JP); Tatsuya Shioiri, Funabashi (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 666 days.

(21) Appl. No.: 15/855,254

(22) Filed: Dec. 27, 2017

(65) Prior Publication Data
US 2018/0181987 A1    Jun. 28, 2018

(30) Foreign Application Priority Data

Dec. 28, 2016 (JP) .............................. JP2016-256825

(51) Int. Cl.
*G06Q 30/02* (2012.01)
*A63F 13/61* (2014.01)
*A63F 13/69* (2014.01)

(52) U.S. Cl.
CPC ......... *G06Q 30/0255* (2013.01); *A63F 13/61* (2014.09); *A63F 13/69* (2014.09); *G06Q 30/0209* (2013.01); *A63F 2300/535* (2013.01); *G06Q 30/0276* (2013.01)

(58) Field of Classification Search
CPC .......... G06Q 30/0255; G06Q 30/0276; G06Q 30/0251; G06Q 30/0209; A63F 13/61; A63F 13/69
See application file for complete search history.

(56) References Cited

U.S. PATENT DOCUMENTS

| | | | | |
|---|---|---|---|---|
| 5,227,874 A * | 7/1993 | Von Kohorn | ........... | A63F 13/12 705/7.32 |
| 5,283,734 A * | 2/1994 | Von Kohorn | ........... | A63F 13/12 463/17 |
| 6,645,068 B1 * | 11/2003 | Kelly | ..................... | G06Q 20/04 463/25 |

(Continued)

FOREIGN PATENT DOCUMENTS

| JP | 2003-529093 A | 9/2003 |
|---|---|---|
| WO | 01/39067 A1 | 5/2001 |

*Primary Examiner* — Waseem Ashraf
*Assistant Examiner* — Robert C Johnson
(74) *Attorney, Agent, or Firm* — Posz Law Group, PLC

(57) ABSTRACT

When a player sets an acquisition target item to be an item he or she wants at a timing of creating a plan, actually required points that are required for acquiring the acquisition target item is determined. Then, options of the advertisement plan in which one or a plurality of advertisements are listed so that watching points reaching the actually required points can be acquired, from options of advertisements that can be watched in exchange for the watching points. When any of the plans is selected and confirmed, an advertisement is displayed based on the plan, and the watching points are given to the player. When the sum of the watching points given reaches the actually required points, the acquisition target item in the plan is given to the player.

14 Claims, 28 Drawing Sheets

(56) References Cited

U.S. PATENT DOCUMENTS

| | | | | |
|---|---|---|---|---|
| 7,797,168 B2* | 9/2010 | Kusumoto | G06Q 30/02 | |
| | | | 705/1.1 | |
| 8,920,243 B1* | 12/2014 | Curtis | G06Q 30/0209 | |
| | | | 463/42 | |
| 9,417,754 B2* | 8/2016 | Smith | G06F 9/4843 | |
| 9,666,029 B1* | 5/2017 | Yu | A63F 13/35 | |
| 10,332,125 B1* | 6/2019 | Fan | G06Q 30/02 | |
| 2002/0087403 A1* | 7/2002 | Meyers | H04N 21/4542 | |
| | | | 705/14.64 | |
| 2002/0155891 A1* | 10/2002 | Okada | G07F 17/3232 | |
| | | | 463/42 | |
| 2004/0044567 A1* | 3/2004 | Willis | A63F 13/48 | |
| | | | 705/14.59 | |
| 2004/0148221 A1* | 7/2004 | Chu | G06Q 30/0252 | |
| | | | 705/14.51 | |
| 2006/0009284 A1* | 1/2006 | Schwartz | G07F 17/3227 | |
| | | | 463/30 | |
| 2006/0128469 A1* | 6/2006 | Willis | A63F 13/61 | |
| | | | 463/42 | |
| 2007/0078706 A1* | 4/2007 | Datta | G06Q 30/0269 | |
| | | | 705/14.5 | |
| 2009/0063283 A1* | 3/2009 | Kusumoto | G06Q 30/0214 | |
| | | | 705/14.25 | |
| 2009/0124384 A1* | 5/2009 | Smith | G07F 17/3248 | |
| | | | 463/42 | |
| 2010/0016080 A1* | 1/2010 | Garden | A63F 13/71 | |
| | | | 463/41 | |
| 2011/0124390 A1* | 5/2011 | Wilen | G07F 17/32 | |
| | | | 463/9 | |
| 2011/0264536 A1* | 10/2011 | Chodroff | G06Q 30/0273 | |
| | | | 705/14.69 | |
| 2011/0312423 A1* | 12/2011 | Mosites | G06Q 30/0209 | |
| | | | 463/42 | |
| 2012/0232988 A1* | 9/2012 | Yang | G06Q 30/02 | |
| | | | 705/14.49 | |
| 2013/0079082 A1* | 3/2013 | Bancel | G07F 17/3255 | |
| | | | 463/9 | |
| 2013/0122993 A1* | 5/2013 | Caldwell | A63F 13/79 | |
| | | | 463/25 | |
| 2013/0339111 A1* | 12/2013 | Ross | A63F 13/533 | |
| | | | 705/14.12 | |
| 2014/0248943 A1* | 9/2014 | Burgin | G06Q 30/0209 | |
| | | | 463/29 | |
| 2017/0004678 A1* | 1/2017 | Leydon | G07F 17/34 | |

\* cited by examiner

FIG.15

630 — CONFIRMED ADVERTISEMENT PLAN MANAGEMENT DATA

- UNIQUE PLAN ID — 631
- CONFIRMED DATE AND TIME — 633
- ACQUISITION TARGET ITEM TYPE — 635
- ACTUALLY REQUIRED POINTS — 637
- ADVERTISEMENT DISPLAY TIMING AND WATCHING TYPE | DURING GAMEPLAY + INDIVIDUALLY — 639

| DISPLAY ORDER (640) | ADVERTISEMENT ID (642) | WATCHING ENVIRONMENT SETTING (644) |
|---|---|---|
| 1 | ADVERTISEMENT 001 | 30 SECONDS ∩ POPUP ∩ LARGE |
| 2 | ADVERTISEMENT 344 | 30 SECONDS ∩ POPUP ∩ LARGE |
| ⋮ | ⋮ | ⋮ |

- INITIALLY ESTIMATED PACE — 646
- INITIALLY ESTIMATED ACQUISITION TIMING — 648
  ⋮
- DISPLAY START DATE AND TIME — 661
- DISPLAY COMPLETED ADVERTISEMENT ID LIST — 663
- WATCHING POINT GIVING HISTORY DATA [GIVING DATE AND TIME, POINT QUANTITY, TYPE IDENTIFICATION FLAG] — 665
- TOTAL ACQUIRED WATCHING POINTS — 667
- POINT ACQUISITION PACE — 669

COMPUTER SYSTEM, GAME SYSTEM, AND GAME DEVICE

Japanese Patent Application No. 2016-256825 filed on Dec. 28, 2016 is hereby incorporated by reference in its entirety.

BACKGROUND

A "reward advertisement" has become a popular means for gaining profits in an online game. The reward advertisement is an advertisement that is displayed on an advertisement screen in a computer such as a user terminal, and features a reward given to a user who has watched the advertisement, accessed a website presented by the advertisement, or installed an application presented by the advertisement (see Japanese Translation of PCT International Application Publication No. JP-T-2003-529093 for example).

In the above-described reward advertisement, the content of the reward advertisement does not basically change within a determined advertising period. Thus, a user playing a game watches the same advertisement over and over again. The advertisement could be regarded as an entertainment when it is seen for the first time. However, watching the same advertisement over and over again is nothing more than a cumbersome obligation. Thus, the user is extremely less incentivized to watch the advertisement despite the reward, and might start skipping the advertisement to be watched or might even feel negative about the advertised product.

A conventional reward advertisement has the content of the reward determined in advance, or the user can know the content of the advertisement only after the reward is given. For example, any item that can be used in the game is given to the player as a reward, without the player knowing whether or not the reward is valuable to him or her. Thus, the player has to watch an advertisement without knowing whether or not the reward is valuable to him or her.

SUMMARY

According to one aspect of the invention, there is provided a computer system comprising: at least one processor or circuit programmed to execute as:

controlling implementation of a game;

setting an acquisition target from given acquisition target options set to be acquirable as an entertainment element related to the game;

setting a plan for advertisement watching serving in exchange for acquiring an acquisition target;

performing display control for the advertisement based on the plan; and performing control to give the acquisition target to the player based on a display history of the advertisement.

BRIEF DESCRIPTION OF THE DRAWINGS

FIG. 15 is a diagram illustrating an example of a data structure of confirmed advertisement management data.

DESCRIPTION OF EXEMPLARY EMBODIMENTS

Figure 1:
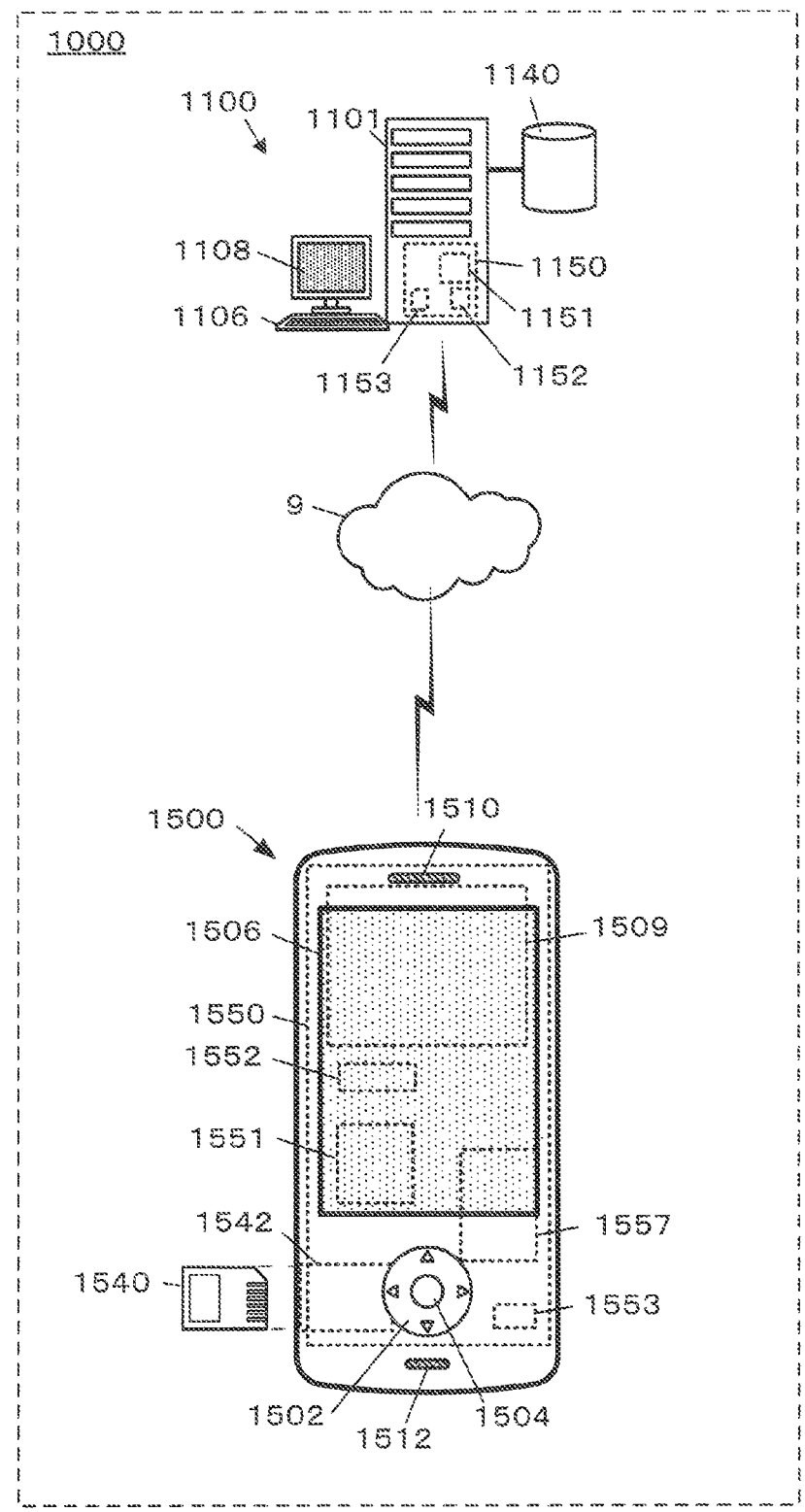
FIG. 1 is a diagram illustrating an example of a configuration of a game system.

The present embodiment can provide a new technique of incentivizing a user to watch a reward advertisement displayed in a game According to one embodiment of the invention, there is provided a computer system comprising: at least one processor or circuit programmed to execute as:

controlling implementation of a game;

setting an acquisition target from given acquisition target options set to be acquirable as an entertainment element related to the game;

setting a plan for advertisement watching serving in exchange for acquiring an acquisition target;

performing display control for the advertisement based on the plan; and performing control to give the acquisition target to the player based on a display history of the advertisement.

The "computer system" as used herein may be a system including a single computer, and may be a system including a plurality of computers that are connected to each other to be capable of performing data communications with each other through a communication line.

The "entertainment element" as used herein includes an item usable in the game, an ability of a player character or the like (such as moves and magic spells), a parameter value related to the game, an appearance changing element for the player character or the like, a ticket for playing minigames and special stages, data on character voice read by a voice actor, a BGM data, and the like.

With this configuration, the entertainment element that can be acquired by the player in return for watching the advertisement can be set as the acquisition target, and an advertisement to be watched for acquiring the acquisition target can be set. The advertisement can be displayed in accordance with the plan. This can be regarded as a contract in which "the player acquires a certain acquisition target for free in return for watching the advertisement in accordance with the plan". Thus, the player can be much more incentivized to watch the advertisement than in cases with the conventional reward advertisement, such as a case where the content of the reward is unknown until the reward is actually given and a case where the same reward is given over and over again with the same advertisement.

In the computer system, the setting the acquisition target may include setting the acquisition target based on a selection operation by a player of the game.

With this configuration, the player can select and set the entertainment element he or she wants to be the acquisition target, and thus can be more incentivized to watch the advertisement.

In the computer system, the setting the acquisition target may include:

selecting and setting options of the acquisition target object to be presented to the player based on a play status of the player; and setting the acquisition target based on the selection operation from the presented options of the acquisition target.

With this configuration, the acquisition target option can change in accordance with the gameplay status. Thus, the acquisition target option changes as the gameplay progresses. Thus, the player can be attracted to the system in which the acquisition target is set in advance and then the advertisement based on the advertisement plan is watched in exchange for the acquisition target.

In the computer system, the setting the plan may include setting the plan based on a selection operation by a player of the game.

With this configuration, the player can create the plan for the advertisement to be watched for acquiring the acquisition target. Thus, sense of responsiveness and a purpose of watching the advertisement can be clarified so that the user can be more incentivized to watch the advertisement.

In the computer system, the setting the plan may include:

performing control for displaying a setting display screen for the plan;

calculating watching points given to the player when advertisement displaying is performed based on a plan displayed on the setting display screen, and performing control for displaying the watching points; and performing display control for required points associated with the acquisition target.

With this configuration, the plan can be created with the points (required points) to be collected to acquire the acquisition target and the points (watching points) that can be acquired in return for watching the advertisement can be presented. Thus, the plan can be easily created. Furthermore, the player can be more easily understand that watching the advertisement is the cost for acquiring the acquisition target.

In the computer system, the setting the plan may include setting the plan with a length of displaying time related to one advertisement displaying included in a setting item of the plan.

With this configuration, the setting item of the plan can include one advertisement display time. Specifically, for example, the player may select the number of displayed advertisements or the display time at one advertisement display timing or the total number of advertisements in the plan as a whole. The length of the display time can be set with the advertisement to be in the plan selected from advertisements for the same product but are different from each other in the display time. Thus, the player can determine how long he or she will watch the advertisement. With the player accepting the display time of the advertisement when the plan is created, the player is less likely to feel annoyed with the game temporarily stopping due to the advertisement watching or the field of view partially occupied with the advertisement. Thus, a factor for making the player less incentivized to watch the advertisement can be reduced. All things considered, the player can be relatively more incentivized to watch the advertisement tan in conventional cases.

In the computer system, the setting the plan may include setting the plan with an advertisement displayed size included in a setting item of the plan.

With this configuration, the setting item of the plan can include the displayed size of the advertisement, that is, the occupancy of the advertisement in the game screen. Thus, the player can determine the size of the advertisement to be watched. With the player accepting the displayed size of the advertisement when the plan is created, the player is less likely to feel annoyed with the game temporarily stopping due to the advertisement watching or the field of view partially occupied with the advertisement. Thus, a factor for making the player less incentivized to watch the advertisement can be reduced. All things considered, the player can be relatively more incentivized to watch the advertisement tan in conventional cases.

In the computer system, the setting the plan may include setting the plan with an advertisement displayed timing included in a setting item of the plan.

With this configuration, the setting item of the plan can include the timing at which the advertisement is displayed. Thus, the player can determine the timing at which the advertisement is to be watched. With the player accepting the timing at which the advertisement is displayed when the plan is created, the player is less likely to feel annoyed with the game temporarily stopping due to the advertisement watching or the field of view partially occupied with the advertisement. Thus, a factor for making the player less incentivized to watch the advertisement can be reduced. All things considered, the player can be relatively more incentivized to watch the advertisement tan in conventional cases.

In the computer system, the setting the plan may include setting the plan with an advertisement category for an advertisement target included in a setting item of the plan.

With this configuration, the setting item of the can include the category (for example, a product, introduction of a game item, introduction of other games, or the like) of the advertisement to be displayed. Thus, the player can determine the category of the product in the advertisement. With the player accepting the category of the advertisement when the plan is created, the player is less likely to feel annoyed with the game temporarily stopping due to the advertisement watching or the field of view partially occupied with the advertisement. Thus, a factor for making the player less incentivized to watch the advertisement can be reduced. All things considered, the player can be relatively more incentivized to watch the advertisement tan in conventional cases.

In the computer system, the setting the plan may include automatically creating the plan based on play information on the player, and presenting the plan to the player.

With this configuration, the plan options can be automatically created, and thus high usability is achieved. The player needs not to set the content of the plan. Thus, the advertisement plan serving as the cost for acquiring the acquisition cost set in advance can be easily selected/set.

The computer system may further comprise estimating a timing at which the acquisition target is given to the player, when advertisement displaying control is performed based on the plan.

With this configuration, the estimated timing at which the acquisition target ca be acquired can be presented to the player. Thus, the player can recognize the estimated acquisition timing, at a timing when the plan is created, and thus watches the advertisement based on the acceptable plan. Thus, the user can be even more incentivized to watch the advertisement.

The computer system may further comprise issuing a recommendation notification for recommending replanning of the plan, based on a display history of the advertisement.

With this configuration, the plan that has been created is not fixed, and the player can be recommended to replan the plan based on an advertisement display history based on the plan. Thus, the advertisement can be provided in a player friendly manner. The replanning might result in the number of advertisements reduced. Still, recommendation for the replanning based on the advertisement display history enables the player to review the advertisement display as appropriate in accordance with the past status of the player watching the advertisement, and thus leads to the player watching the advertisement with a positive impression.

An advertisement output control system may comprise: a server system that is the computer system; and a user terminal to which the player inputs an operation, the server system and the user terminal being connected to the game system to be capable of performing a communication with each other.

With this configuration, the system connected with the server system and the user terminal to perform communications with each other can achieve the effects described above.

14. In a game device connected to a server system managing data on an advertisement to be capable of performing a communication with each other, the game device may comprise an operation input section to which the player inputs an operation.

With this configuration, the game device including the operation input section used by the player to input an operation can achieve the effects described above.

Exemplary embodiments of the present invention are described below. It is a matter of course that modes to which the present invention can be applied are not limited to the embodiments described below.

First Embodiment

An example of display control for a given advertisement in a game starting based on a gameplay start operation by a player is described as a first embodiment. In the present embodiment, an online-multi-play action roll playing game (ARPG) is described as an example of the game. However, genre of the game according to the present invention is not limited to this.

[Hardware Configuration]

First of all, an example of a hardware configuration according to the present embodiment is described.

FIG. 1 is a diagram illustrating an example of a configuration of a game system according to the present embodiment. A game system 1000 according to the present embodiment is a system including a server system 1100 and a user terminal 1500 that can be connected to a communication line 9 to communicate with each other to exchange data. The illustrated example includes a single user terminal 1500. However, in an actual operation, a plurality of user terminals 1500 of different users who play the game (hereinafter, referred to as "players") may each be connected to and communicate with the server system 1100. The game system 1000 as a whole may be referred to as a computer system, or the sever system 1100 and the user terminal 1500 may each be referred to as an individual computer system.

The communication line 9 is a communication channel that enables data communications. Specifically, the communication line 9 includes a communication network such as a local area network (LAN) using a private line (private cable) for direct connection, Ethernet (registered trademark), and the like, a telecommunication network, a cable network, and the Internet. The communication method may be a cable communication method or a wireless communication method.

The server system 1100 includes a main body device 1101, a keyboard 1106, a touch panel 1108, and a storage 1140. A control board 1150 is provided in the main body device 1101.

The control board 1150 includes microprocessors of various types (e.g., a CPU 1151, a GPU, and a DSP), an IC memory 1152 of various types (e.g., a VRAM, a RAM, and a ROM), and a communication device 1153. The control board 1150 may partially or entirely be implemented with an application specific integrated circuit (ASIC), a field-programmable gate array (FPGA), and a system on a chip (SoC).

Through a calculation process performed by the control board 1150 based on a predetermined program and data, the server system 1100 implements 1) a user management function related to user registration and the like 2) an online shopping function of selling various items, usable in the game, to the user online, and 3) a game management function of providing data required to play the game with the user terminal 1500, to manage play control on the game played with the user terminal 1500. Thus, the game according to the present embodiment is implemented as one type of client-server online games.

The server system 1100 is illustrated/described as a single server. Alternatively, a plurality of blade servers, in charge of various functions, may be installed while being connected to each other via an internal bus to be capable of performing data communications with each other. Furthermore, a plurality of independent servers, disposed in locations distant from each other, may perform data communications with each other via the communication line 9 to function as the server system 1100 as a whole.

The user terminal 1500 is a computer system, usable by a registered user serving as a player to play the game, and is an electronic device (electronic apparatus) that can access the server system 1100 via the communication line 9 to implement an online game. The user terminal 1500 according to the present embodiment is a device known as a smartphone. The user terminal 1500 may also be a portable game device, a game controller, a personal computer, a tablet computer, a wearable computer, an arcade game device, or the like.

The user terminal 1500 includes an arrow key 1502, a button switch 1504, a touch panel 1506 that functions as an image display device and as a touch position input device, a speaker 1510, a built-in battery 1509, a microphone 1512, a control board 1550, and a memory card reader 1542 that can write and read data to and from a memory card 1540 that is a computer readable storage medium. The user terminal 1500 further includes a power button, a volume control button, and the like (not illustrated). Furthermore, the user terminal 1500 may be provided with an IC card reader that can implement contactless writing and reading of data to and from an IC card as a credit card or a prepaid card usable for payment involved in playing the game, and a position measurement module such as a GPS module.

The control board 1550 includes a processor of various types (e.g., a CPU 1551, a GPU, and a DSP); an IC memory 1552 of various types (e.g., a VRAM, a RAM, and a ROM), a wireless communication module 1553 for performing wireless communications with a mobile phone base station, a wireless LAN base station, or the like connected to the communication line 9, an interface circuit 1557; and the like.

The interface circuit 1557 includes circuits such as a driver circuit that drives the touch panel 1506, a circuit that receives signals from the arrow key 1502 and the button switch 1504, an output amplifier circuit that outputs a sound signal to the speaker 1510, an input signal generation circuit that generates a signal corresponding to the sound collected by the microphone 1512, and a signal input-output circuit that inputs and outputs a signal to and from the memory card reader 1542.

The elements mounted on the control board 1550 are electrically connected with each other via a bus circuit or the like to be capable of exchanging data and signals. The control board 1550 may partially or entirely be implemented with an ASIC, an FPGA, or a SoC. The control board 1550 stores a client program and various types of data, for implementing a function as the user terminal of the game according to the present embodiment, in the IC memory 1552.

The client program and various types of setting data are downloaded by the user terminal 1500 from the server system 1100 in the present embodiment. The program and the data may also be read from a storage medium such as the memory card 1540 additionally provided.

Figure 2:
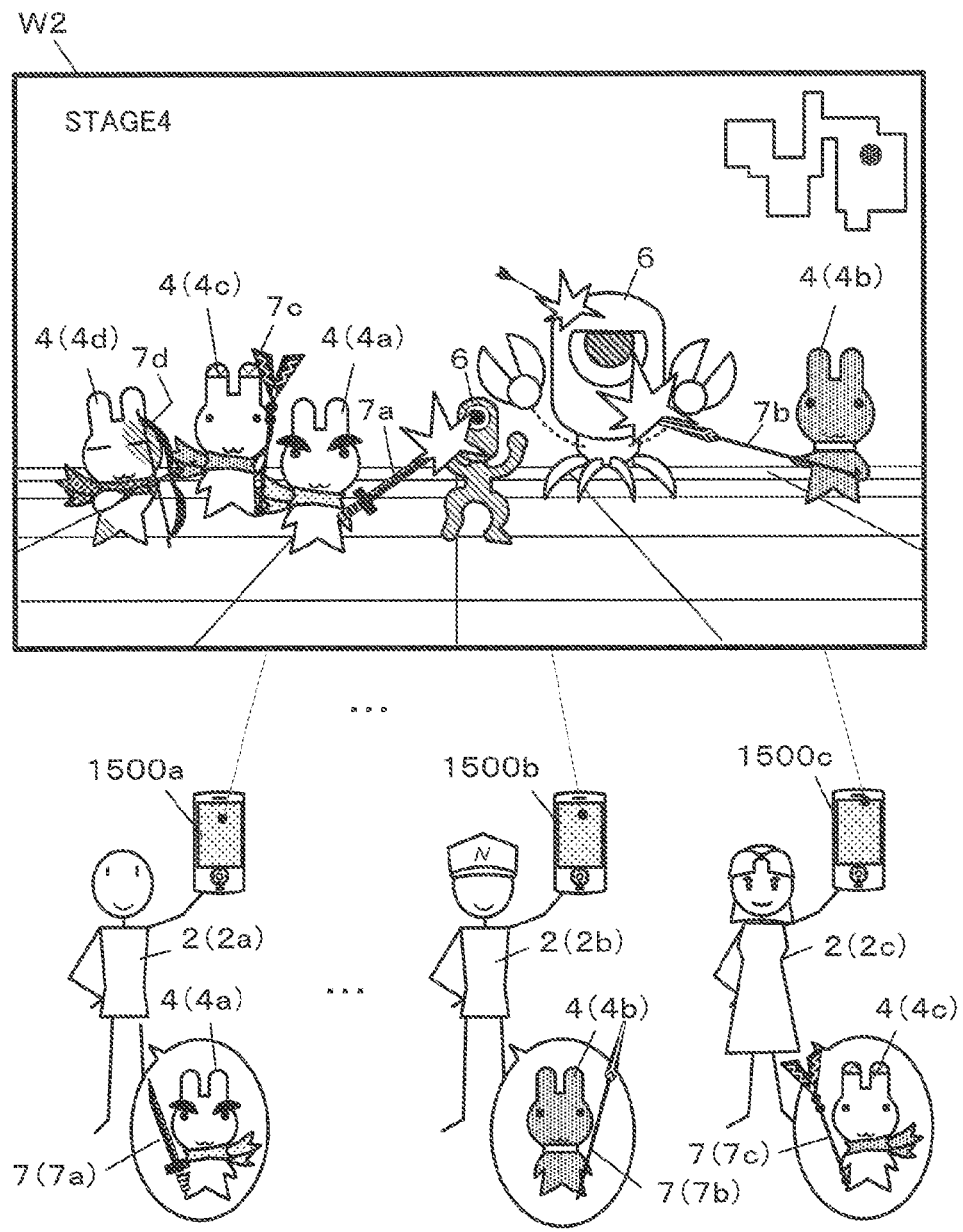
FIG. 2 is a diagram illustrating a content of a game.

FIG. 2 is a diagram illustrating a content of the game according to the present embodiment.

The game according to the present embodiment is a multi-online type action roll playing game (ARPG) simultaneously played by multiple players 2 (2a, 2b, . . . ) using their user terminals 1500 (1500a, 1500b, . . . ).

The players 2 (2a, 2b, . . . ) organize parties and select a stage they play together. The players 2 (2a, 2b, . . . ) operate their characters, serving as player characters 4 (4a, 4b, . . . ), to achieve a goal set to the stage (such as finding a predetermined treasure or defeating a boss character, for example) while fighting with an enemy character 6 that is a non-player character (NPC) confronted in a game space of the stage.

The players 2 (2a, 2b, . . . ) can enjoy the game by making the player characters 4 (4a, 4b, . . . ) equip various items 7 (7a, 7b, . . . ), usable in the game, purchased with online shopping or obtained during the gameplay. The player character 4 equipping or using a stronger item 7 can have more improved abilities, so that the player 2 can be more advantageous while playing the game.

Game screens W2 of the user terminals 1500 (1500a, 1500b, . . . ) display what is going on in the same game space. In the illustrated example, the same game screen W2 is displayed on the user terminals 1500 (1500a, 1500b, . . . ) with a single virtual camera provided for capturing an image of the game space and generating an image based on which the game screen is generated. Note that the virtual camera may be provided for each of the players 2 (2a, 2b, . . . ), that is, for each of the user terminals 1500 (1500a, 1500b, . . . ), and the game screens W2 from different points of view may be provided to display what is going on in the same game space.

Figure 3:
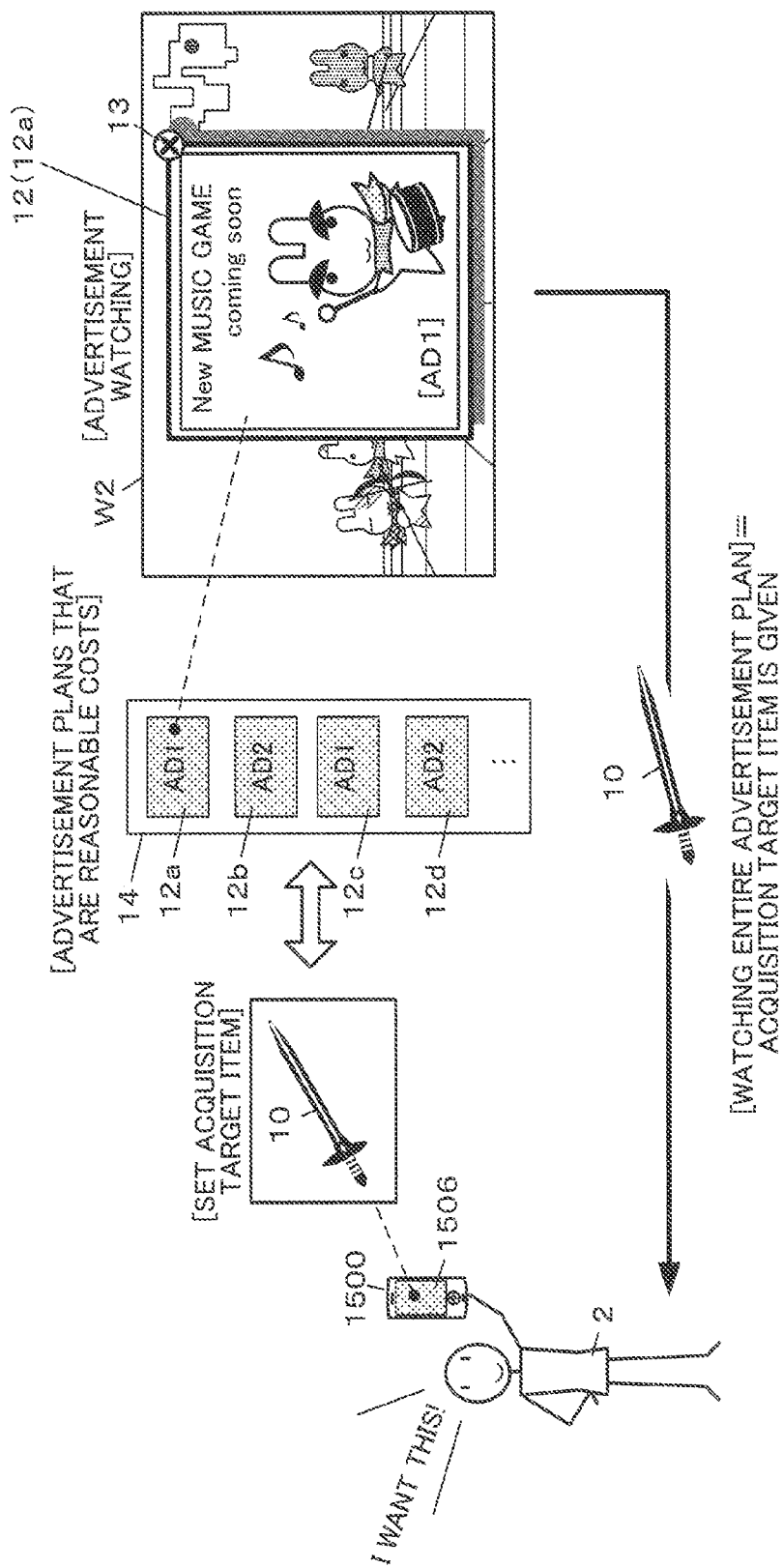
FIG. 3 is a diagram illustrating a system of a reward advertisement according to a first embodiment.

FIG. 3 is a diagram illustrating a system of a reward advertisement according to the present embodiment.

A conventional advertisement watched in exchange for a reward which is what is known as a reward advertisement is provided with a reward determined in advance or randomly determined. Thus, the players 2 have not been able to freely determine the content of the reward. The reward advertisement according to the present embodiment enables the player to select the reward he or she wants in advance.

In the present embodiment, an entertainment element is given as a reward for watching an advertisement.

The "entertainment element" can be set as appropriate in accordance with the content of the game. The game according to the present embodiment is an ARPG, and thus the following elements can be set 1) what is known as an item such as a weapon, armor, goods, and a magic spell book usable by the player character 4, 2) an ability that can be additionally provided to the player character 4 (such as moves, magic spells, and skills for example), 3) improvement of the ability of the player character 4, 4) an additional outer-view changing element for the player character 4 (such as custom model data and coloring pattern for example), 5) a ticket for playing minigames and special stages, 6) data on a character voice read by a voice actor, 7) BGM data, 8) game currency, 9) a play time extension ticket, and the like. The entertainment elements are hereinafter collectively referred to as an "item". Other examples of the "entertainment element" include a free game ticket for other games, a ticket for participating in an event outside the game, and the like may also be set.

The player 2 can select a desired item to be an acquisition target item 10, and select/determine an advertisement watching plan 14 including one or a plurality of advertisements 12 (12a, 12b, . . . ) serving as the cost for acquiring the item. When the plan 14 is determined, the advertisement 12 is controlled to be displayed based on the plan 14. When the advertisement in the plan 14 is entirely watched, the acquisition target item 10 is given to the player 2. Note that the player can stop watching the advertisement and abort the advertisement plan while the advertisement is being displayed based on the plan 14, if the acquisition target item 10 is purchased with online shopping implemented by the server system 1100 or acquired as reward as a result of gameplay.

A flow of a process between the setting of the acquisition target item 10 and the determination of the plan 14 is described more in detail.

Figure 4:
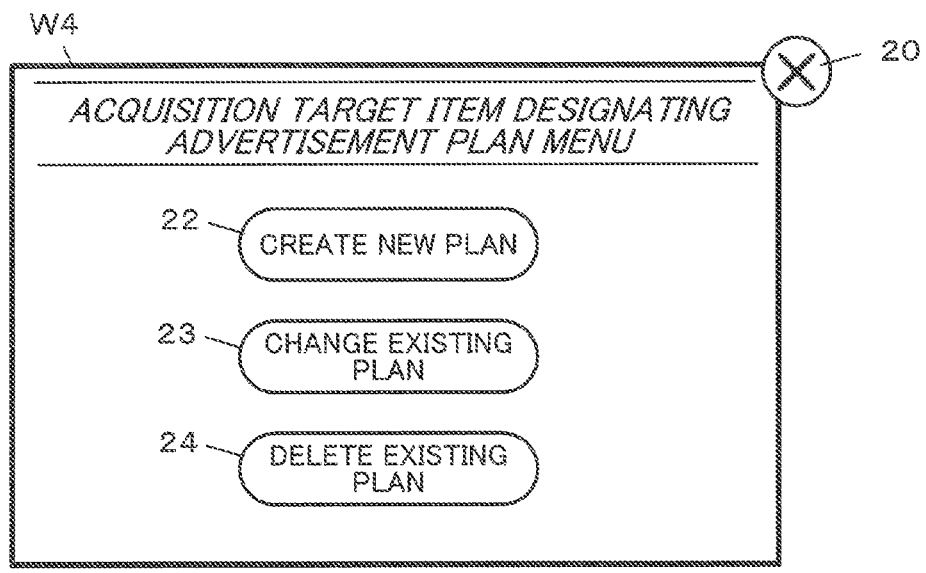
FIG. 4 is a diagram illustrating a displayed example of a plan menu screen related to an advertisement plan.

FIG. 4 is a diagram illustrating a displayed example of a plan menu screen W4 related to the advertisement plan. This screen is displayed when a game application program (game software) is started in the user terminal 1500, a predetermined login procedure is performed, and then a predetermined operation is performed on the main menu. Note that the screen can be displayed in any other ways.

The plan menu screen W4 is displayed to be overlapped on the main game screen, and the player 2 can stop displaying of the plan menu screen W4 by operating a display end icon 20. The plan menu screen W4 includes a create plan icon 22 for inputting an operation for creating a new advertisement plan, a change icon 23 for inputting an operation for changing an existing plan, and a delete icon 24 for inputting an operation for interrupting and aborting an existing plan. Note that the menu items are not limited to these, and the items can be omitted or other items can be added as appropriate.

Figure 5:
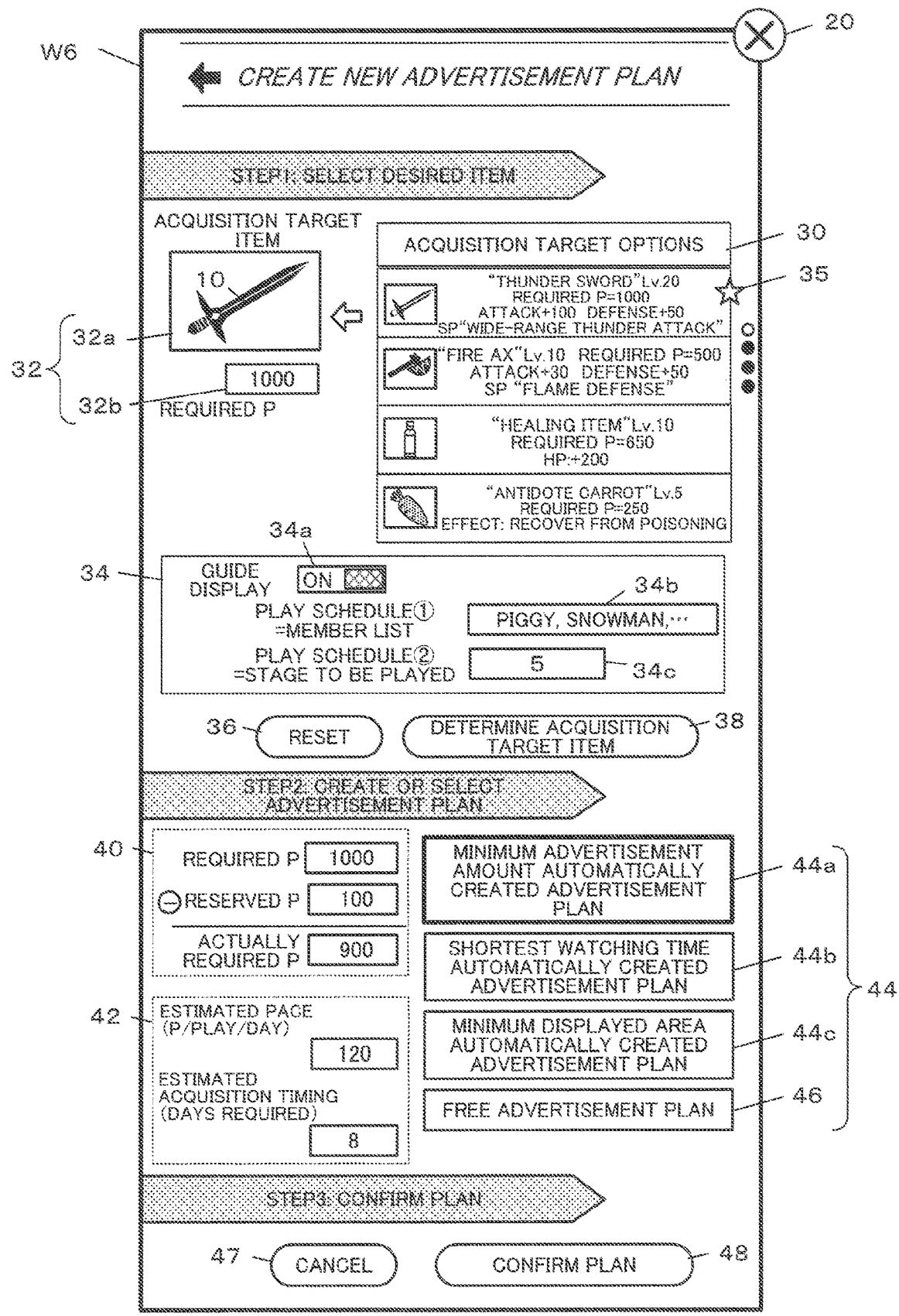
FIG. 5 is a diagram illustrating a display example of a new plan creation screen.

When an operation on the create plan icon 22 is detected in the plan menu screen W4, a new plan creation screen W6 as illustrated in FIG. 5 is displayed on the user terminal 1500. The new plan creation screen W6 is displayed to be overlapped on the main game screen, and the player 2 can stop displaying the new plan creation screen W6 and cancel the creating of a new plan by operating the display end icon 20.

The creating of the new plan roughly includes three procedures including "selecting acquisition target item", "selecting or creating advertisement plan", and "confirming advertisement plan". Thus, the new plan creation screen W6 is divided into sections, corresponding to the procedures, to be displayed.

Specifically, the new plan creation screen W6 includes a section, for the "selecting acquisition target item", including an acquisition target option display section 30, an acquisition target item display section 32, a guide display setting section 34, a reset operation section 36, and a confirming operation section 38.

In the acquisition target option display section 30, options of the acquisition target item 10 are displayed with items that can be currently acquirable by the player 2 automatically selected based on play information on the player 2 (for example, total play times, play result, a history of purchasing an item required for the gameplay, or the like). Specifically, an image of an item, the name of the item, a brief description of the item, and "required points" serving as a cost index value for the item are displayed in association with each other. The acquisition target option display section 30 supports a scroll operation, and acquisition target options other than those on the screen can be displayed by horizontally scrolling this section.

The player 2 selects a desired option in the acquisition target option display section 30 and performs a predetermined operation (for example, any display frame in the acquisition target option display section 30 is dragged and dropped into the acquisition target item display section 32) to set the acquisition target item 10.

The acquisition target item display section 32 displays an image 32a and required points 32b of the currently selected acquisition target item 10.

The guide display setting section 34 is a section where a setting for guide display for selecting the acquisition target item 10 is input. In the present embodiment, the section includes a display switching operation section 34a as well as a scheduled play member input section 34b and a scheduled play stage input section 34c for inputting a scheduled play status based on which guiding is performed.

The display switching operation section 34a serves as a switching switch used for inputting an operation for switching the guide display ON and OFF. When the guide display is ON, the item determined to be preferable based on the scheduled play status input using the scheduled play member input section 34b and the scheduled play stage input section 34c is extracted from the options displayed on the acquisition target option display section 30. Then, a guide marker 35 is displayed on the extracted option. Thus, the recommended acquisition target item 10 is presented to the player 2.

When a touch operation is performed on the scheduled play member input section 34b, an input section for inputting an account of another player who plays the game together with the player is displayed as a popup as appropriate.

When a touch operation is performed on the scheduled play stage input section 34c, an input section for inputting identification information on a game stage to be played by the player is displayed as a popup as appropriate.

The reset operation section 36 receives an operation for resetting the setting of the acquisition target item 10 (restoring the initial setting, returns to "not set" in a case of creating a new plan).

The confirming operation section 38 receives an operation of confirming the selection of the acquisition target item 10.

The new plan creation screen W6 includes a section, for the "selecting or creating advertisement plan", including actually required points details display section 40, an estimation display section 42, automatically created advertisement plan displaying operation icons 44 (44a, 44b, . . . ), and a free advertisement plan creating operation icon 46.

The actually required points details display section 40 presents details of points that need to be earned by watching the advertisement to acquire the acquisition target item 10 to the player. In the present embodiment, the player basically obtains (earns) a watching pointset to an advertisement, by watching the advertisement based on the plan, to obtain the required points serving as a cost index value for the acquisition target item 10. In this context, the watching points that have been obtained in the past but have not been used is reserved as a "reserved points (reserved P in the figure)". An actually required points (actually required P in the figure) is calculated by subtracting the reserved points from the required points of the acquisition target item 10. When the advertisement is entirely watched based on the plan and the sum of the watching points obtained in the process reaches the actually required points, the acquisition target item 10 is given to the player.

The estimation display section 42 notifies the player of estimation information related to acquisition of the acquisition target item 10. In the present embodiment, an estimated accumulating pace of the watching points given by the advertisement watching (for example, "point/play/day assuming that the player plays the game once a day) and an estimated timing at which the item is acquired (for example "in xx days") obtained based on the pace and the actually required points are notified.

The estimated pace is an estimated value based on the currently selected plan. In the present embodiment, the value is calculated based on the number of times the advertisement is displayed in each gameplay, estimated in advance based on the displaying timing set in the currently and tentatively selected plan. The estimated pace may be determined based on the history of advertisement watching under the same display setting as the currently selected plan, which can be derived from the past advertisement watching history of the player.

The automatically created advertisement plan displaying operation icon 44 receives a detail display operation for the advertisement plan automatically created based on predetermined optimization algorisms. In the present embodiment, plans are prepared including 1) a "minimum advertisement amount automatically created advertisement plan" based on an optimization algorism set to minimize the number of advertisement to be displayed; 2) a "shortest watching time automatically created advertisement plan" based on an optimization algorism set to minimize the advertisement watching time; and 3) a "minimum displayed area automatically created advertisement plan" based on an optimization algorism set to minimize the total advertisement display area. The automatically created advertisement plan displaying operation icons 44 (44a, 44b, . . . ) for these three plans are displayed.

Types of optimization other than these can be set as appropriate. For example, optimization based on categories of an advertisement targets, that is, advertisement categories may be prepared as appropriate. Specifically, a "foods and beverages prioritized automatically created advertisement plan" in which advertisements for foods and beverages are prioritized, an "object targeted for men prioritized automatically created advertisement plan" in which advertisements for products such as automobiles and cameras that mainly attract male's attention are prioritized, an "object targeted for women prioritized automatically created advertisement plan" in which advertisements for products such as clothing, jewelry, and cosmetics that mainly attract female's attention are prioritized, and a "tourism prioritized automatically created advertisement plan" in which advertisements for hot springs and tourist attractions are prioritized, and the like may be prepared.

In the present embodiment, the minimum advertisement amount automatically created advertisement plan is tentatively selected as an initial setting. Thus, the estimation display section 42 displays estimation information corresponding to a case where the minimum advertisement amount automatically created advertisement plan is selected. When a predetermined tentative selection operation is performed on the automatically created advertisement plan displaying operation icon 44, the estimation display section 42 displays estimation information based on a plan newly selected tentatively.

The free advertisement plan creating operation icon 46 receives a start operation for creating an advertisement plan with the player selecting the advertisement to be displayed. The free advertisement plan can be created when the player performs a touch operation on the icon.

Figure 6:
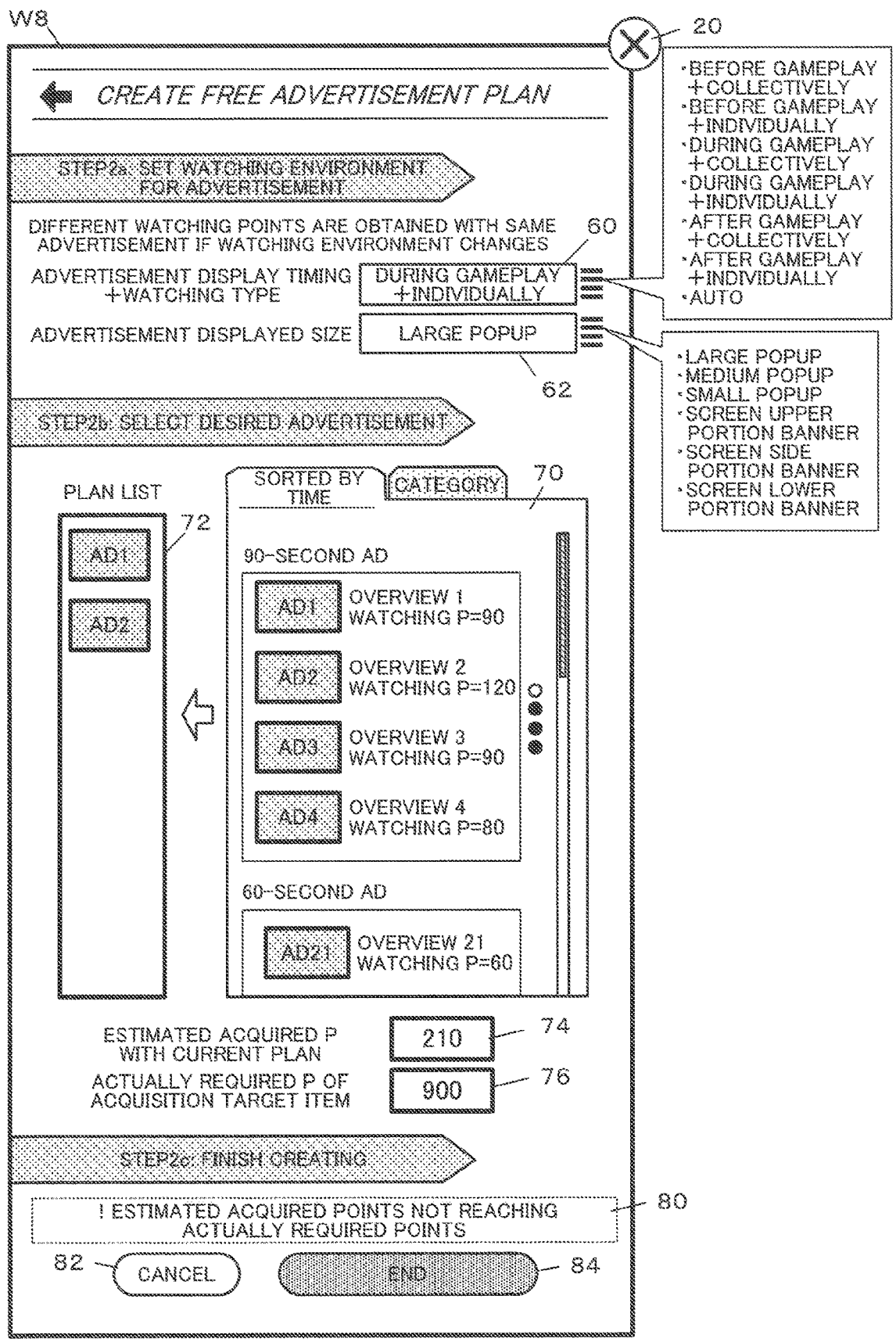
FIG. 6 is a diagram illustrating a display example of a free advertisement plan creating screen.

FIG. 6 is a diagram illustrating a displayed example of a free advertisement plan creating screen W8.

The free advertisement plan creating screen W8 is displayed when the touch operation on the free advertisement plan creating operation icon 46 is detected, and is closed to return to the new plan creation screen W6 with the creating of the free advertisement plan cancelled when the player 2 operates the display end icon 20.

The creating of the free advertisement plan roughly includes three procedures including "setting advertisement watching environment", "selecting advertisement to be watched", and "finish creating". Thus, the free advertisement plan creating screen W8 is divided into sections, corresponding to the procedures, to be displayed.

First of all, the free advertisement plan creating screen W8 has a section, for the procedure "setting advertisement watching environment", including an advertisement display timing selection section 60 and an advertisement display size selection section 62.

The advertisement display timing selection section 60 receives an operation to select a situation, after the game application (game software) according to the present embodiment has started, in which the advertisement is displayed based on the plan. Options for the status may be set as appropriate in accordance with the content of the game or a game system design. Options for the status may be set as appropriate in accordance with the content of the game or a game system design. In the present embodiment, a total of seven types of options are prepared (6 types (main three modes based on gameplay (before, during, and after gameplay)×two sub modes (whether a plurality of advertisements are collectively or individually displayed)+"auto").

Specifically, the main three modes include 1) displaying an advertisement "before gameplay" including while the menu is being displayed before the gameplay, during online shopping, and during chatting, 2) "during game" meaning that an advertisement is displayed during the gameplay, and 3) displaying an advertisement "after gameplay" including while the play result is being displayed after the gameplay, while the menu is being displayed, during online shopping, and during chatting. The option "auto" is setting including all the three main types.

The two sub modes are settings related to the displaying time length of a single advertisement displaying. In the present embodiment, the options include 1) "collectively" with which a single display start operation results in a predetermined number of advertisements or advertisements within a predetermined time period being sequentially displayed and 2) "individual" with which one advertisement is displayed in each advertisement displaying. Note that the options of the sub modes are not limited to these, and may be set to be in a unit of time such as 15 seconds, 60 seconds, 90 seconds, . . . . The option for the "auto", which may be set as appropriate, is set to be "individual" in the present embodiment.

The advertisement display size selection section 62 receives an operation for selecting a displayed size of an advertisement or a displayed position of an advertisement in the game screen. The section may have options set as appropriate in accordance with the layout of the game screen, and the size and the quantity of the touch panel 1506 of the user terminal 1500. In the present embodiment, an advertisement pops up on the game screen to be displayed, with three types of the display sizes (large, medium, and small) prepared. Furthermore, a banner advertisement having a predetermined size is displayed at a predetermined position in the game screen, with three types of screen positions (screen upper portion, screen side portion, and screen lower portion) prepared. Thus, a total of six options are prepared.

The free advertisement plan creating screen W8 includes, for the procedure "selecting advertisement to be watched", an advertisement option display section 70, a plan list 72, an estimated acquired point display section 74, and actually required points display section 76.

The advertisement option display section 70 displays a list of various sponsored advertisements each associated with an icon of the advertisement (a rectangle displayed with CMn in the figure, n being a natural number), an overview, and a watching points (watching P in the figure) given to the player when the advertisement is watched. The advertisement option display section 70 includes a plurality of tags, and the list of the advertisements can be displayed with sorting performed under a sort condition for each tag. In the present embodiment, two tags corresponding to advertisement displaying time and to a category of an advertisement content are prepared. Note that any one of these may be omitted, or a tag with another sort condition may be additionally provided.

The plan list 72 displays icons for advertisements in the current plan. The player can perform a predetermined operation (for example, a drag and drop operation) for moving an icon of the desired advertisement from the advertisement option display section 70 to the plan list 72, to add the advertisement to the plan. The player can also perform the drag and drop operation for removing the icon from the plan list 72, to delete the advertisement from the plan.

The estimated acquired point display section 74 displays the sum of watching points of the advertisements in the plan list 72. The player sets the advertisement plan so that the value displayed in the estimated acquired point display section 74 reaches that displayed in the actually required points display section 76.

The free advertisement plan creating screen W8 includes, for the procedure "finish creating", a point shortage warning section 80, a free advertisement plan creation cancel operation icon 82, and a plan creation termination operation icon 84.

When the value in the estimated acquired point display section 74 has not reached that in the actually required points display section 76, the point shortage warning section 80 displays a text and an image for notifying the user of the situation.

The free advertisement plan creation cancel operation icon 82 receives an operation for cancelling and stopping the creating of the free advertisement plan.

The plan creation termination operation icon 84 receives an operation for finishing the creating of the free advertisement plan.

Referring back to FIG. 5, when the player performs a predetermined calling operation (for example, a swiping operation in a direction from right to left using a finger touching the screen) on the automatically created advertisement plan displaying operation icon 44, details of a corresponding automatically created advertisement plan displayed as a popup. More specifically, the setting advertisement watching environment and the plan list are displayed.

When the free advertisement plan has not been created yet, unique display modes indicating "created" and "not created" are prepared for the free advertisement plan creating operation icon 46. The modes are automatically switched from one to the other in accordance with whether or not the free advertisement plan exists. Details of the free advertisement plan displayed as a popup when a predetermined calling operation is performed, as in the case of the automatically created advertisement plan displaying operation icon 44.

When a predetermined selection operation (for example, a two-finger tap operation) is performed on any one of the automatically created advertisement plan displaying operation icon 44 and the free advertisement plan creating operation icon 46, tentative determination is made.

The new plan creation screen W6 includes, for the last procedure "determining advertisement plan" related to creating of a new plan, a plan creation cancel operation icon 47 and a plan confirming operation icon 48.

The plan creation cancel operation icon 47 receives an operation for cancelling and stopping the creating of a plan.

The plan confirming operation icon 48 receives an operation for confirming the plan. With this operation, a plan tentatively determined with any one of the automatically created advertisement plan displaying operation icon 44 and the free advertisement plan creating operation icon 46 is confirmed as a new plan created. When the plan is confirmed, displaying of the new plan creation screen W6 is cancelled.

Referring back to FIG. 3, when the plan 14 is created and confirmed, display control for the advertisements 12 (12a, 12b, ...) starts in accordance with the plan.

Figure 7:
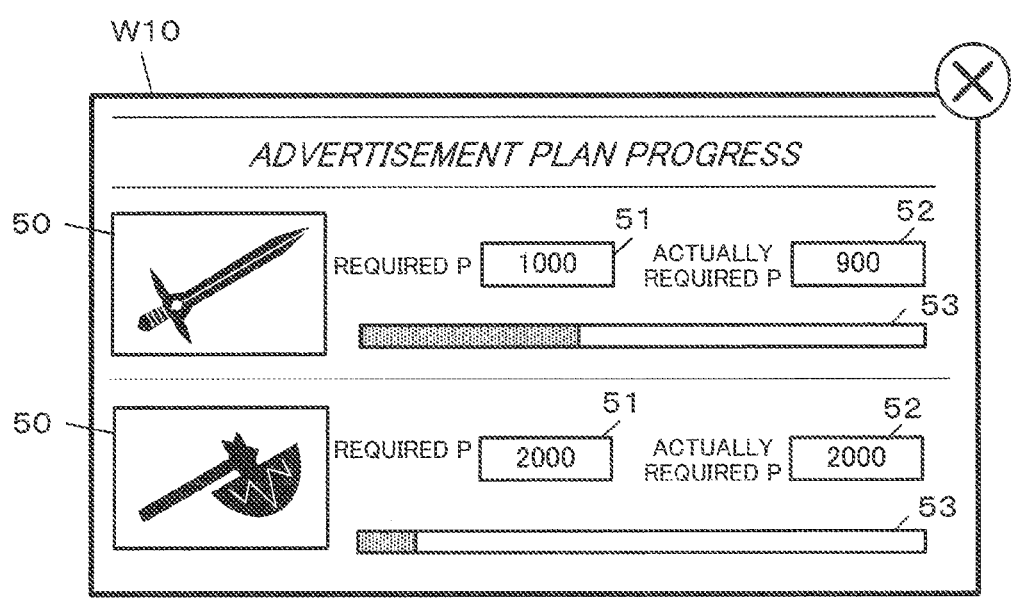
FIG. 7 is a diagram illustrating a display example of a progress checking screen.

When the display control is performed for the advertisements 12, the player can input a predetermined progress checking operation to recognize how far the plan 14 has progressed. Specifically, a progress checking screen W10 illustrated in FIG. 7 is displayed.

The progress checking screen W10 displays, for each plan 14 created and executed, a set of an item image 50 of the acquisition target item 10 in the plan, required points display 51, actually required points display 52, and an attainment graph 53 indicating a ratio of acquired watching points (acquired point) to the actually required points. In the illustrated example, two sets are displayed.

Information displayed on the progress checking screen W10 is not limited to these, and other types of information may be added or any of these types of information may be omitted as appropriate. For example, the number of advertisements in the plan 14 that have been watched and a ratio of the watched advertisement displaying time may be displayed.

The acquired watching points, displayed with the attainment graph 53, are basically acquired by watching the advertisement 12. In the present embodiment, "deemed watching points", which is regarded as being equivalent to the watching points usable as a cost for the acquisition target item 10, is given while the game is implemented in some cases.

A condition of giving the "deemed watching points" and an amount of the points given can be set as appropriate in accordance with the game system design or the content of the game. Examples of the condition for giving the point include when a user is initially registered, when a total login times reaches a round number (for example, 100 times or 1000 times), when the number of registered friends reaches a round number, a bonus for purchasing a sale product through online shopping, a gift for participating in an event, a reward for finishing an event, and the like.

A function of recommending the player to replan the advertisement plan, when the total acquired watching points are accumulated at a pace higher than that scheduled in the plan, due to the acquisition of the deemed watching points (=the watching points acquired by advertisement watching+ the deemed watching points), is prepared. Specifically, a recommendation such as "do you want to change the plan to acquire the acquisition target item 10 in a shorter period of time?" can be provided.

Furthermore, the player is recommended to replan the advertisement plan also when the player frequently cancels the advertisement watching by intentionally operating an advertisement display cancel operation icon 13 (see FIG. 3) after the displaying of the advertisement 12 starts in accordance with the plan 14 and thus the sum of the acquired watching points (=the watching points acquired by advertisement watching+the deemed watching points) is not accumulated at a scheduled pace in the created plan.

Figure 8A:
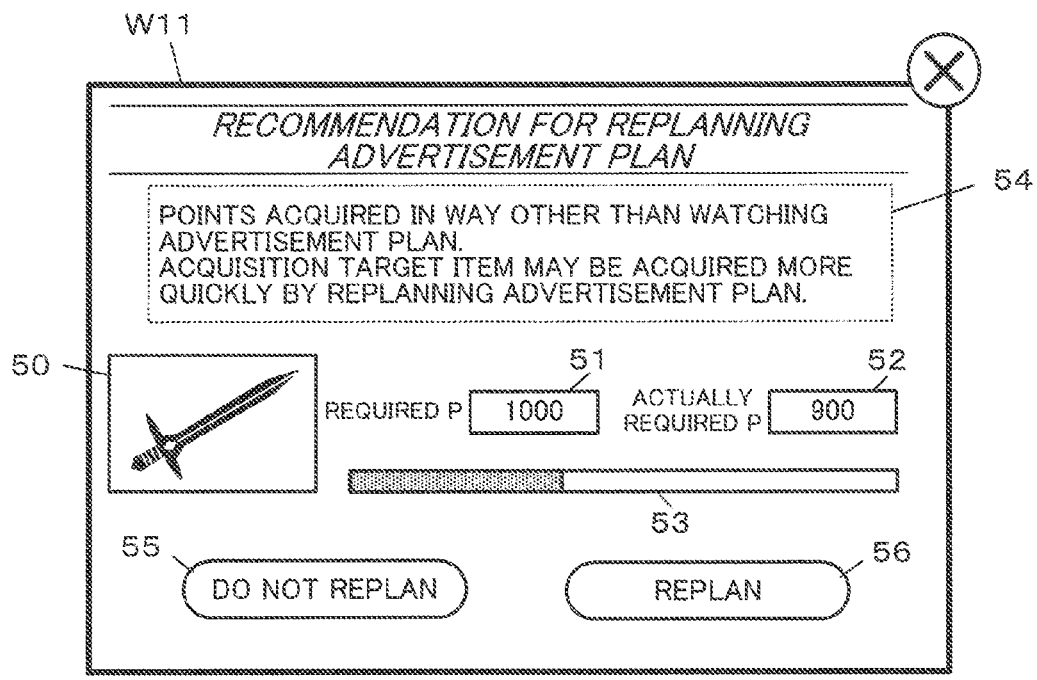
FIG. 8A is a diagram illustrating a display example of a replanning recommendation screen.
Figure 8B:
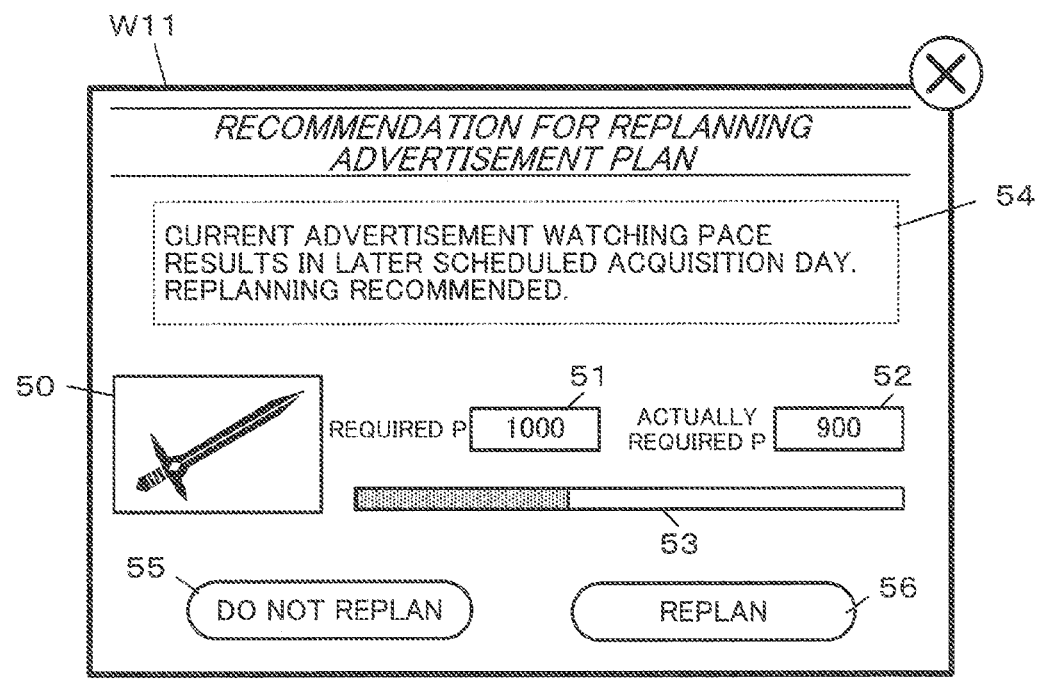
FIG. 8B is a diagram illustrating a display example of a replanning recommendation screen.

Specifically, a replanning recommendation screen W11 as illustrated in FIG. 8A and FIG. 8B is displayed. FIG. 8A illustrates a display example corresponding to the case where the total acquired watching points are accumulated at a pace equal to or higher than a scheduled pace in the plan. FIG. 8B illustrates a display example corresponding to the case where the total acquired watching points are not accumulated at a rate equal to or higher than the scheduled rate in the plan.

The replanning recommendation screen W11 includes a set of the item image 50, the required points display 51, the actually required points display 52, and the attainment graph 53 related to the acquisition target item 10 in the corresponding plan, a recommendation reason display 54 for notifying a reason for recommending the replanning, a replanning denying operation icon 55, and a replanning start operation icon 56.

In an example of the recommendation reason display 54 illustrated in FIG. 8A, the player is notified that the sum of the acquired watching points is accumulated at a pace equal to or higher than the scheduled pace in the plan, to recommend the player to replan the plan.

In an example of the recommendation reason display 54 illustrated in FIG. 8B, the player is notified that the sum of the acquired watching points is not accumulated at a pace higher equal to or higher than the scheduled pace in the plan, and thus is recommended to replan the plan.

When the replanning denying operation icon 55 is operated, the replanning recommendation screen W11 is closed, and the replanning is not performed as recommended this time.

When the replanning start operation icon 56 is operated, replanning starts.

Figure 9:
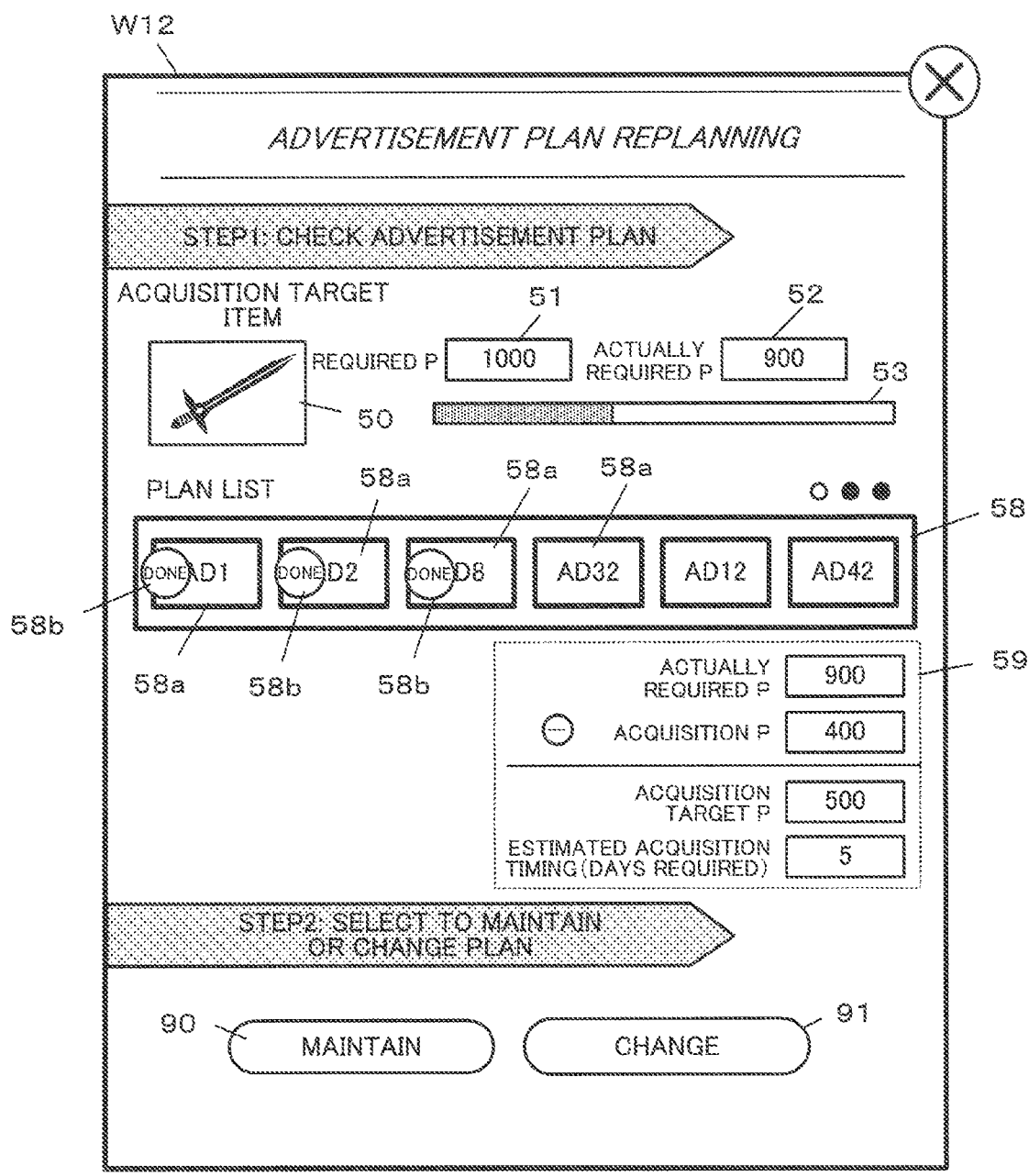
FIG. 9 is a diagram illustrating a display example of a plan replanning screen.

When the advertisement plan replanning starts, a plan replanning screen W12 as illustrated in FIG. 9 is displayed. The plan replanning roughly includes two procedures including "checking advertisement plan" and "selecting to maintain or change plan".

The plan replanning screen W12 includes a section, for the procedure "checking advertisement plan", including the set of the item image 50, the required points display 51, the actually required points display 52, and the attainment graph 53 related to the plan to be replanned as well as a plan list 58 and a point detail display section 59 displayed.

The plan list 58 is a list of icons 58a of advertisements in the plan displayed with a display completed mark 58b to the icon 58a corresponding to the advertisement that has already been displayed.

For example, the point detail display section 59 displays items including: actually required points (the actually required P in the figure) at a point of starting the plan; an acquired point (the acquired point P in the figure) that is the sum of the watching points acquired so far; an acquisition target point (the acquisition target P in the figure) that needs to be acquired (actually required P-acquired P); a scheduled acquisition date at which the acquisition target point is to be acquired estimated based on the acquisition pace; and the like.

The plan replanning screen W12 has a section, for the procedure "selecting to maintain or change plan", including a plan maintaining operation icon 90 and a change start operation icon 91 displayed.

When the plan maintaining operation icon 90 is operated, the plan replanning screen W12 is closed with no change in the plan.

When the change start operation icon 91 is operated, the plan change for completely redoing the plan from the setting of the acquisition target item 10 starts. Specifically, the screen transitions to the plan menu screen W4 (see FIG. 4) to induce the player to select and operate the change icon 23, or the plan change may start with the transitioning to the plan menu screen W4 skipped. When the plan change is performed, a screen having the same configuration as the new plan creation screen W6 (see FIG. 5) is displayed but has a different title. In this process, the initial setting of the plan to be changed is set for the acquisition target item 10.

[Functional Configuration]

Figure 10:
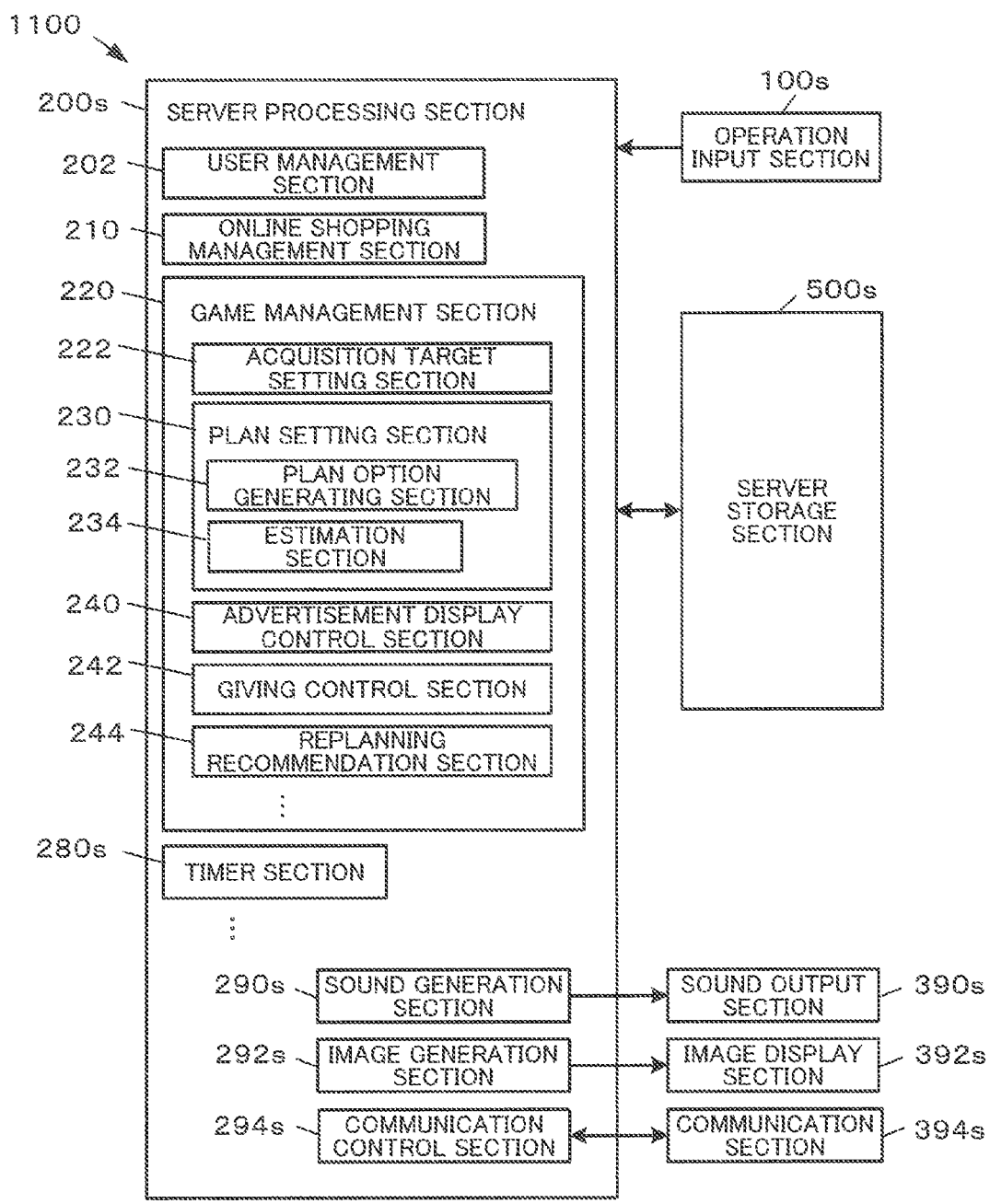
FIG. 10 is a functional block diagram illustrating an example of a functional configuration of a server system according to a first embodiment.

FIG. 10 is a functional block diagram illustrating an example of the functional configuration of the server system 1100 according to the present embodiment. The server system 1100 according to the present embodiment includes an operation input section 100s, a server processing section 200s, a sound output section 390s, an image display section 392s, a communication section 394s, and a server storage section 500s.

The operation input section 100s is for inputting various operations for management. The operation input section 100s corresponds to the keyboard 1106 in FIG. 1.

The server processing section 200s is implemented with electronic parts such as a processor (e.g., a CPU and a GPU), an ASIC, and an IC memory. The server processing section 200s controls data exchanged between functional sections including the operation input section 100s and the server storage section 500s, and performs a calculation process based on a predetermined program, data, the operation input signal from the operation input section 100s, data revived from the user terminal 1500, and the like to entirely control the operation of the server system 1100.

The server processing section 200s according to the present embodiment includes a user management section 202, an online shopping management section 210, a game management section 220, a timer section 280s, a sound generation section 290s, an image generation section 292s, and a communication control section 294s. Note that functional sections other than these may be included as appropriate.

The user management section 202 performs a process related to a user registration procedure and manages the data of each user associated with an account (user ID). In the present embodiment, the user management section 202 has various functions including: 1) issuing an account to a registered user; 2) registration information management for registering and managing personal information for each account; 3) book keeping management for a payment medium consumed for paying for a charged element related to the game (for example, the gameplay, charged lottery, online shopping, and the like); and 4) play history management for managing login/logout history. Note that any other appropriate management function for other data associated with the account can be included.

The online shopping management section 210 is in charge of control related to the online shopping that is one of the charged elements, and can be implemented with a known online shopping technique as appropriate. In the present embodiment, the player can purchase items, an executable lottery ticket, an event participation ticket, and the like through online shopping. Any other elements may be set as appropriate to be sold in the online shopping.

The game management section 220 performs various processes related to game play management. The game according to the present embodiment is a client-server online game, and thus the game management section 220 communicates with the user terminal 1500 to perform control for providing data required for the gameplay.

Specifically, the game management section 220 includes an acquisition target setting section 222, a plan setting section 230, an advertisement display control section 240, a giving control section 242, and a replanning recommendation section 244. Note that functional sections other than these may be included as appropriate.

The acquisition target setting section 222 performs control for setting an acquisition target from given acquisition target options set to be acquirable as the entertainment element related to the game. Specifically, acquisition target options to be presented to the player are selected and presented based on the play information on the player, and the acquisition target, in the acquisition target options presented, may be set based on a selection operation by the player (see FIG. 5).

The plan setting section 230 performs control for setting a plan for advertisement watching serving in exchange for acquiring an acquisition target. The plan may be set to include a setting item including at least one of: running time related to advertisement display; a display size of an advertisement; a display timing of the advertisement; and an advertisement category indicating a target of the advertisement (see FIG. 6).

The plan setting section 230 according to the present embodiment may set a plan based on the selection operation performed by the player or automatically set a plan (see FIG. 5). The plan setting section 230 includes a plan option generating section 232 and an estimation section 234.

The plan option generating section 232 can automatically generate plan options based on the play information on the player and present the options to the player. The plan option generating section 232 corresponds to an automatically created advertisement plan in the present embodiment.

The estimation section 234 estimates the timing at which the acquisition target is given to the player when the advertisement display control is performed based on the plan, and can present the timing to the player. The estimation section 234 corresponds to the estimation display section 42 according to the present embodiment (see FIG. 5).

The advertisement display control section 240 performs display control for the advertisement 12 based on the plan (see FIG. 3).

The giving control section 242 performs control for giving the acquisition target to the player based on a result of execution of the advertisement display by the advertisement display control section 240. The result of executing the advertisement displaying is as follows. Specifically, elapsed time after the advertisement displaying has started is measured. When the elapsed time satisfies a predetermined deemed advertisement watching completed condition of the advertisement (for example, a ratio of the elapsed time to the running time of the advertisement), the advertisement is deemed to have been watched. Thus, a predetermined watching points corresponding to the advertisement is given to the player. When the total watching points given, that is, the total acquired watching points reach the actually required points related to the acquisition target in the plan, the acquisition target is given to the player.

The replanning recommendation section 244 performs control to issue a recommendation notification for recommending the user to replan the plan based on an execution status of the advertisement displaying by the advertisement display control section 240. The replanning recommendation section 244 corresponds to the control related to the replanning recommendation screen W11 (see FIG. 8A and FIG. 8B) and the plan replanning screen W12 (see FIG. 9) according to the present embodiment.

The timer section 280s uses a system clock to obtain the current date and time, a time limit, and the like.

The sound generation section 290s is implemented with an integrated circuit (IC) or by executing software that generates sound data and performs decoding, and generates or decodes sound data on a sound related to system management for the server system 1100 or related to the gameplay, background music (BGM), and a character voice. The resultant sound signal related to the system management is output to the sound output section 390s.

The sound output section 390s receives the sound signal to emit the corresponding sound, and corresponds to a speaker (not illustrated) of the main body device 1101 or the touch panel 1108 in the example illustrated in FIG. 1.

The image generation section 292s can generate an image related to the system management for the server system 1100, a game image (or data for displaying the game image on the user terminal 1500), and the like. The image related to the system management can be output to the image display section 392s.

The image display section 392s displays various images for system management based on the image signals input from the image generation section 292s. For example, the image display section 392s may be implemented with an image display device such as a flat panel display, a cathode-ray tube (CRT), a projector, or a head-mounted display. The image display section 392s corresponds to the touch panel 1108 in the example illustrated in FIG. 1.

The communication control section 294s performs a data process related to the data communications, and exchanges data with an external device through the communication section 394s. In the present embodiment, a process related to the data communications with the user terminal 1500 is performed.

The communication section 394s connects to the communication line 9 to implement communications. The communication section 394s is implemented with a transceiver, a modem, a terminal adapter (TA), a jack for a communication cable, a control circuit, and the like. The communication section 394s corresponds to the communication device 1153 in the example illustrated in FIG. 1.

The server storage section 500s stores a program and various types of data for implementing various function of the server processing section 200s for entirely controlling the server system 1100. The server storage section 500s is used as a work area for the server processing section 200s, and temporarily stores the results of calculations performed by the server processing section 200s based on various programs. The function of the server storage section 500s is implemented with an IC memory (e.g., RAM and ROM), a magnetic disk (e.g., hard disk), an optical disk (e.g., CD-ROM and DVD), an online storage, or the like, corresponding to a storage medium such as the IC memory 1152 and hard disk mounted in the main body device 1101 and the storage 1140, in the example illustrated in FIG. 1.

Figure 11:
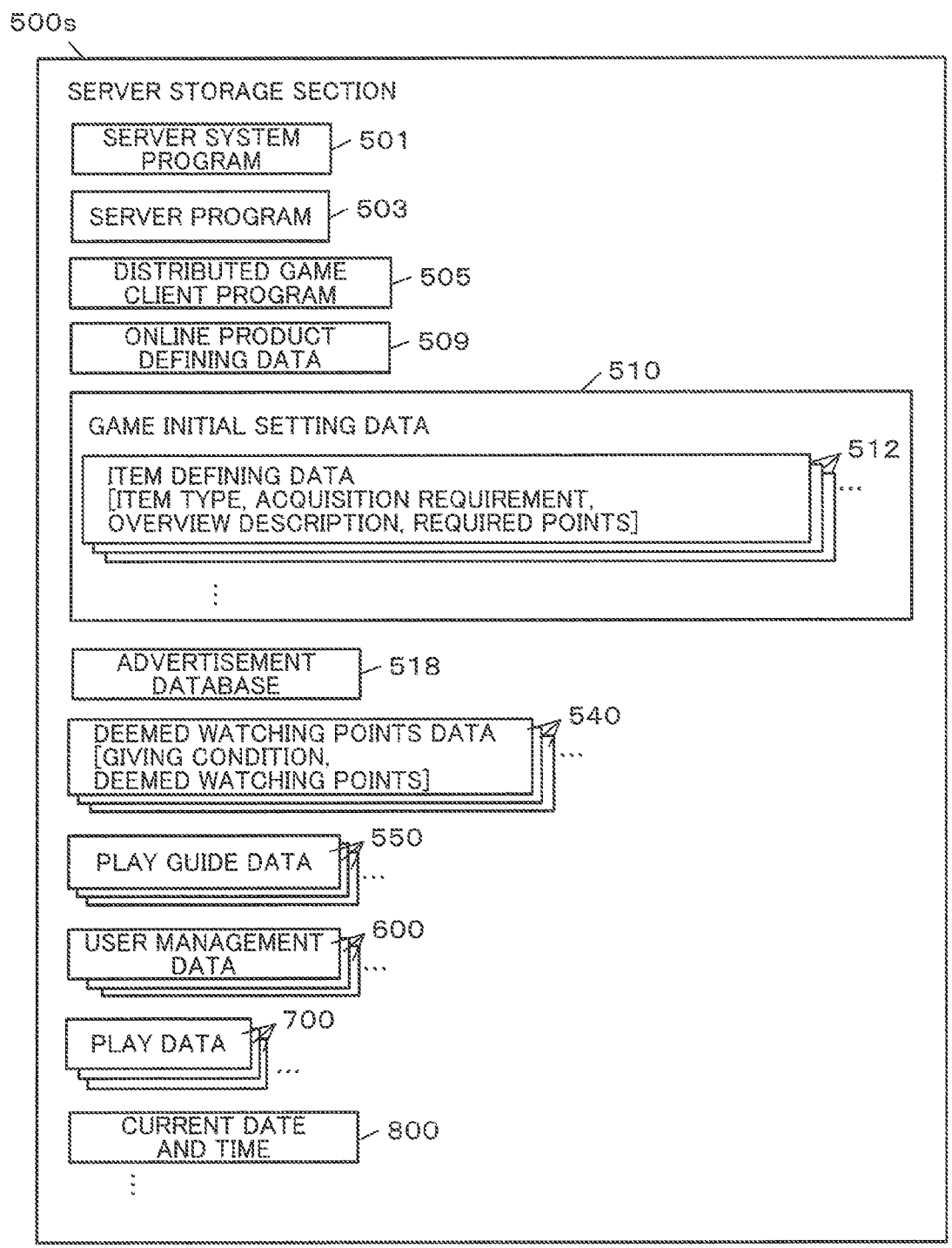
FIG. 11 is a diagram illustrating an example of a program and data stored in a server storage section according to the first embodiment.

FIG. 11 is a diagram illustrating an example of a program and data stored in the server storage section 500s according to the present embodiment. The server storage section 500s stores therein in advance, a server system program 501, a server program 503, a distributed game client program 505, online product defining data 509, game initial setting data 510, an advertisement database 518, deemed watching point setting data 540, and playing guide data 550.

The server storage section 500s stores data, sequentially generated and managed, including user management data 600, play data 700, and current date and time 800. Furthermore, information on a timer, a counter, various flags, and the like may be stored as appropriate.

The server system program 501 is read out and executed by the server processing section 200s for causing the server system 1100 to implement a basic input/output function required for a computer.

The server program 503 is read out and executed by the server processing section 200s for implementing functions of the user management section 202, the online shopping management section 210, and the game management section 220 (see FIG. 10).

The distributed game client program 505 is an original of a game client program provided to the user terminal 1500.

The online product defining data 509 is data defining a product purchasable through the online shopping implemented by the online shopping management section 210 (see FIG. 10). One online product defining data 509 includes a unique product type (for example, an item type or the like), a purchasing cost, a quantity given, and a product category associated with each other. It is a matter of course that information other than these may be included as appropriate.

The game initial setting data 510 includes various types of initial setting data, defining data, and the like for executing the game according to the present embodiment. In the present embodiment, the game initial setting data 510 includes item defining data 512.

The item defining data 512 is prepared for each item type, and includes various types of defining data related to the item. One item defining data 512 includes a unique item type, an acquisition requirement indicating a requirement to be satisfied by the player to acquire the item, an overview description describing an overview of the name and effects of the item, required points for acquiring the item in return for the advertisement watching, and effect defining data defining the effect of the item. Note that data other than these can be included as appropriate.

Figure 12:
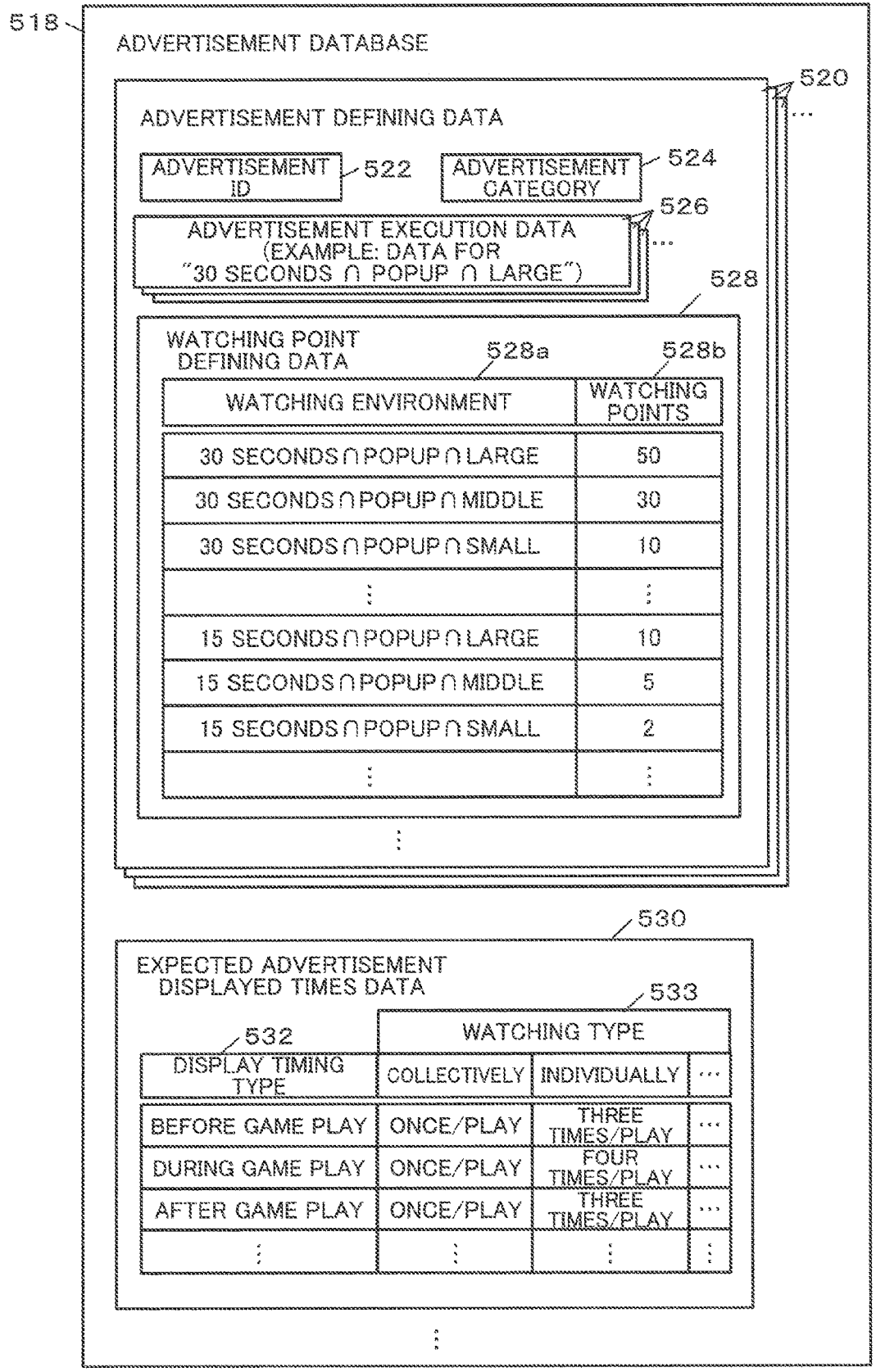
FIG. 12 is a diagram illustrating an example of a data structure of an advertisement database.

The advertisement database 518 stores therein advertisement defining data 520 including various types of defining data for each sponsored advertisement 12 (see FIG. 3) and expected advertisement displayed times data 530 as illustrated in FIG. 12 for example. Note that data other than these can be included as appropriate.

One advertisement defining data 520 includes a unique advertisement ID 522, an advertisement category 524, advertisement execution data 526, and watching point defining data 528. Note that data other than these can be included as appropriate.

The advertisement category 524 is information on a category of an advertisement. For example, the information includes: 1) a category based on the content of the advertisement such as introduction of another game, beverage, or insurance, introduction of a new item, event notification, and the like, 2) a category based on a required time of an advertisement such as 90 seconds, 60 seconds, and 30 seconds, and 3) a category based on a display mode of an advertisement such as a movie and a still image.

The advertisement execution data 526 is data for actually displaying the advertisement 12. In the present embodiment, the data is prepared for each watching environment (in other words, for each advertisement play mode) based on a combination between required time and a displayed size of an advertisement. Note that a single piece of common data may be prepared. In the present embodiment, only popup display is employed for displaying an advertisement. Note that data may be prepared for each of watching environments based on combinations further involving other display types (banner). Furthermore, a displayed position and display transparency may be included.

The watching point defining data 528 includes watching points 528b, associated with the type of a watching environment 528a, given to the player when the advertisement is displayed in the watching environment.

The watching environment 528a according to the present embodiment is defined by elements including required time (displayed time) and a display size of the advertisement. Note that the elements may further include a display type. The type of the required time and the type of the display size can be set as appropriate. Note that elements other than these can be added to the elements defining the watching environment 528a. For example, the displayed position and the display transparency (semitransparent, opaque, or the like) can also be set.

The watching point defining data 528 may have a threshold value associated with the items described above. The threshold value is related to the execution result of the advertisement watching for determining whether or not to give or not give the watching points 528b (for example, the length of the elapsed time after the advertisement displaying has started and a ratio of the elapsed time to the required time of the advertisement).

The expected advertisement displayed times data 530 is data based on which an estimated pace and estimated acquisition timing (see the estimation display section 42 in FIG. 5) in the advertisement plan are estimated. The data defines the number of times the advertisement display timing arrives in each gameplay, excepted by an administrator of the game, for each combination between the display timing type 532 and the watching type 533 of the advertisement.

In the present embodiment, two watching types 533 are set including: "collective" for collectively displaying a predetermined plurality of advertisements at one advertisement display timing; and "individual" for displaying a single advertisement only. Note that types other than these, such as "random" which is a combination of these types or "auto", may be set as appropriate.

Referring back to FIG. 11, the deemed watching point setting data 540 defines the "deemed watching points", which are points given to the player through a way other than advertisement watching and can be used for the required points of the acquisition target item 10, as in the case of the watching points. The deemed watching point setting data 540 is prepared for each situation for giving the deemed watching points. The data includes a giving condition describing the situation and the deemed watching points to be given, associated with each other.

Figure 13:
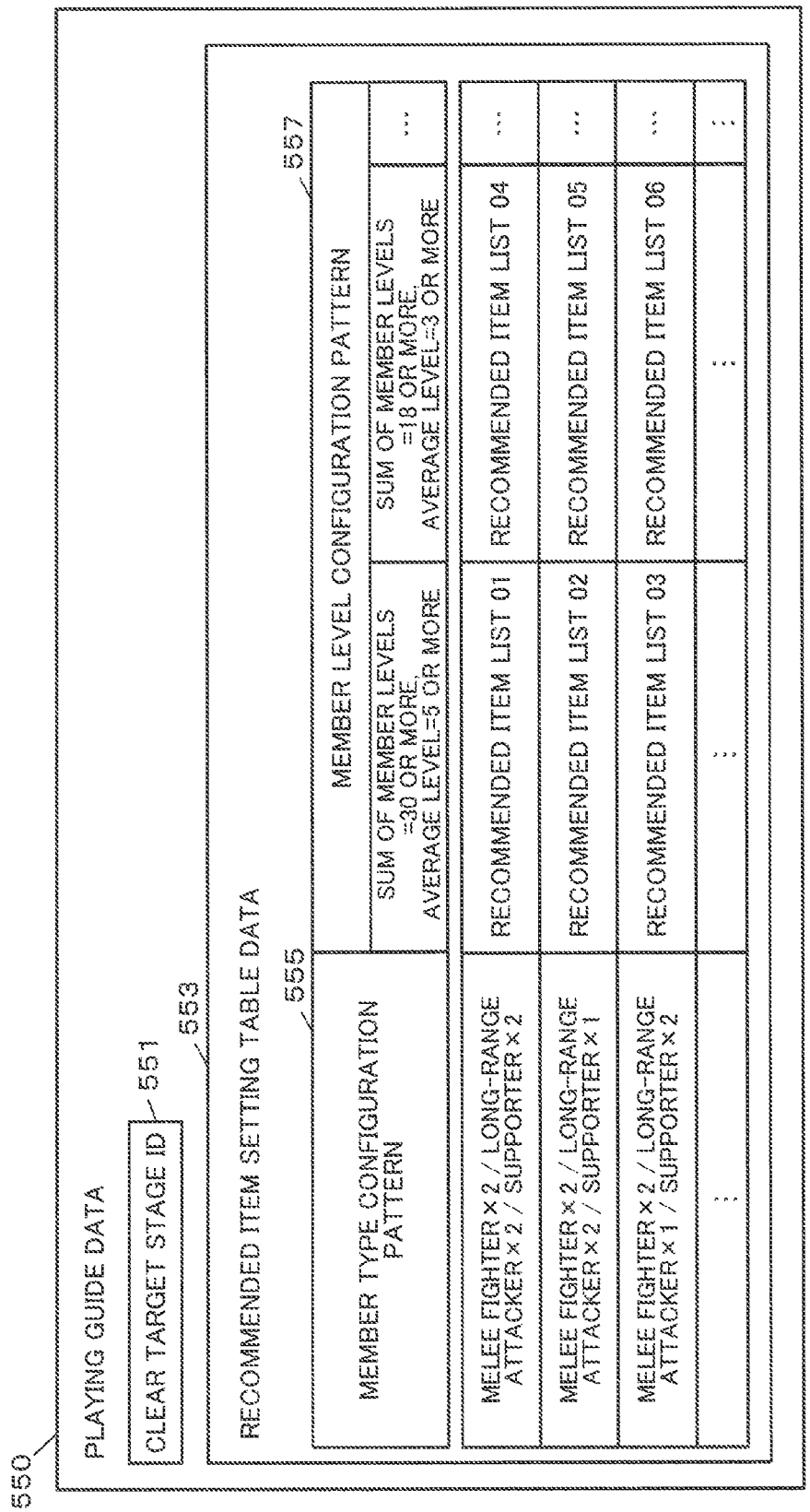
FIG. 13 is a diagram illustrating an example of a data structure of playing guide data.

The playing guide data 550 includes information for guiding the player to clear the game. In the present embodiment, the playing guide data 550 is prepared for each game stage. For example, as illustrated in FIG. 13, one playing guide data 550 includes a clear target stage ID 551 and recommended item setting table data 553.

The recommended item setting table data 553 includes a list of items (a recommended item list 01, a recommended item list 02, . . . ) recommended for clearing the game stage indicated by the clear target stage ID 551, for each combination between a member type configuration pattern 555 and a member level configuration pattern 557, based on the combination.

The member type configuration pattern 555 indicates a configuration of a character type of the player character 4 of each of the player and other players that play the game together. The configuration pattern can be set as appropriate in accordance with the content of the game. In the present embodiment, an example is described where a game (ARPG) is played with a party organized with a maximum of six player characters 4 that are each one of three types including melee fighter, long range attacker, and supporter.

The member level configuration pattern 557 indicates a configuration of skills of the player and other players who play the game together. A parameter value representing the skill may include a player level, a level or a growth rate of the player character, and the like.

The number of items in the recommended item list may be set to be one or more than one, as appropriate.

Referring back to FIG. 11, the user management data 600 is prepared for each registered user, that is, for each player, and includes various types of data associated with the user account. In other words, the user management data 600 is first play information on a player related to a game.

Figure 14:
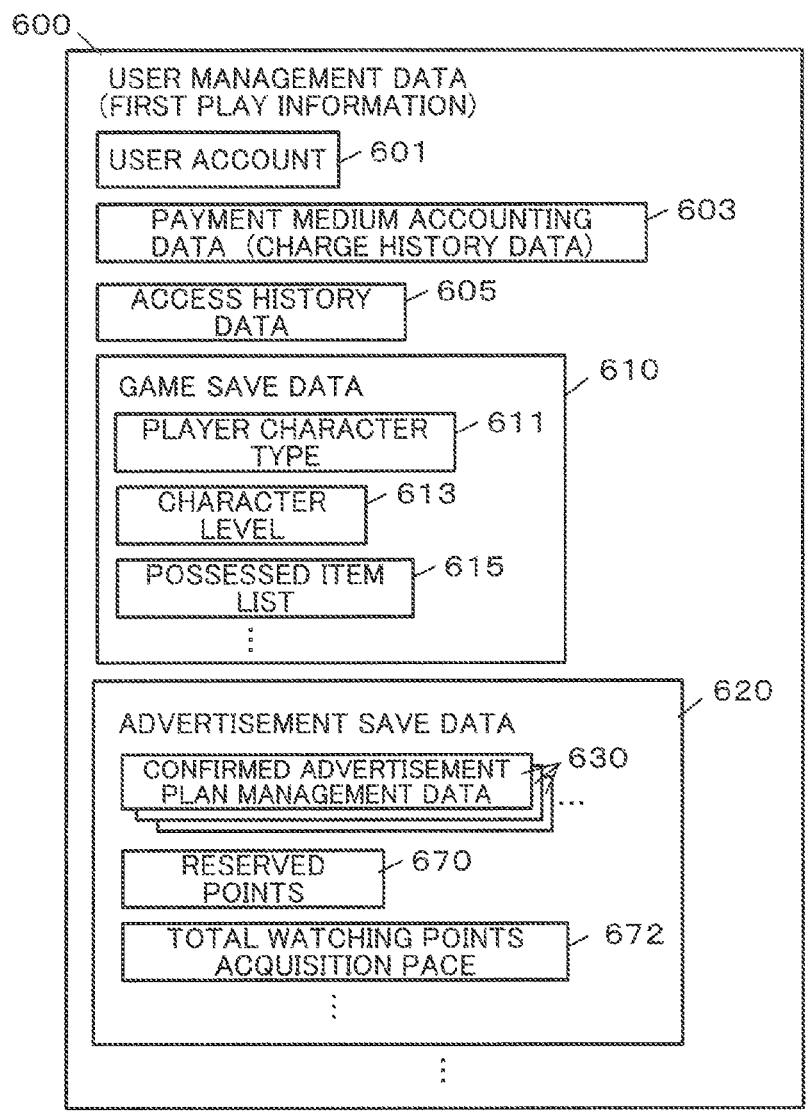
FIG. 14 is a diagram illustrating an example of a data structure of user management data.

For example, as illustrated in FIG. 14, one user management data 600 includes a unique user account 601, payment medium accounting data 603, access history data 605, game save data 610, and advertisement save data 620. Note that data other than these can be included as appropriate.

The payment medium accounting data 603 serves as what is known as an account book storing therein information on a charged/consumed amount of the payment medium associated with the user, information on a reason for the charging/consumption, and information on changed date and time in association with each other. The payment medium accounting data 603 can also be referred to as charge history data or charge information.

The access history data 605 is data in which the past game played timings are stored in series, and is automatically updated at a login/logout timing.

The game save data 610 includes various types of data indicating the game progress status at the previous gameplay. For example, the game save data 610 includes a player character type 611 indicating the type of the player character 4, a character level 613, and a possessed item list 615. Note that data other than these can be included as appropriate.

The advertisement save data 620 is save data related to advertisement displaying related to the user at the last login time. In the present embodiment, the advertisement save data 620 includes confirmed advertisement plan management data 630, reserved points 670, and a total watching points acquisition pace 672. Note that data other than these can be included as appropriate.

The confirmed advertisement plan management data 630 includes various types of data defining an advertisement plan that has been created by the user but has not been completed and various types of data describing an execution result of the plan. For example, as illustrated in FIG. 15, one confirmed advertisement plan management data 630 includes 1) a unique plan ID 631,
2) confirmed date and time 633 at which the plan is created and confirmed,
3) an acquisition target item type 635,
4) actually required points 637,
5) an advertisement display timing and watching type 639,
6) an advertisement ID 642 and a watching environment setting 644 associated with a display order 640,
7) an initially estimated pace 646,
8) an initially estimated acquisition timing 648,
9) display start date and time 661,
10) a display completed advertisement ID list 663,
11) watching point giving history data 665,
12) total acquired watching points 667, and
13) a point acquisition pace 669.

Note that data other than these can be included as appropriate.

The advertisement ID 642, associated with the display order 640, is a content of the plan list 72 (see FIG. 6) in the free advertisement plan creating screen W8 and the plan list 58 (see FIG. 9) displayed in the plan replanning screen W12, related to the plan.

The initially estimated pace 646 indicates a pace at which the watching points are acquired, estimated at the point when the plan is confirmed.

The initially estimated acquisition timing 648 is an estimated timing at which the acquisition target item is given, that is, an estimated timing at which the acquired watching points reach the actually required points estimated, based on the confirmed date and time 633, at the point when the plan is confirmed. In the present embodiment, a unit of "days" is employed and how many more days is estimated. Note other units may be employed.

The display start date and time 661 indicates date and time at which the advertisement displaying is performed for the first time based on the plan.

The display completed advertisement ID list 663 is a list of IDs of displayed advertisements, in the advertisement IDs 642.

The watching point giving history data 665 is a history of watching points given to the player by watching the advertisement in the plan and deemed watching points. For example, the watching point giving history data 665 includes an amount of point given and a type identification flag indicating the watching points or the deemed watching points associated with each other.

The total acquired watching points 667 indicates a sum of the watching points and the deemed watching points given to the player.

The point acquisition pace 669 indicates an increasing pace of the total acquired watching points 667, obtained based on the watching point giving history data 665, and is automatically updated each time the watching points or the deemed watching points are given, that is, each time the watching point giving history data 665 is updated.

Referring back to FIG. 14, the reserved points 670 indicates a value of the acquired watching points that have been acquired but remains unused, due to interruption, abortion, or the like of the plan, at the last logout timing.

The total watching points acquisition pace 672 indicates an average value of the point acquisition pace 669 (see FIG. 15) over the entire past period of the user or within the last predetermined period (for example, within a month), and is automatically updated when the point acquisition pace 669 is updated.

Referring back to FIG. 11, the play data 700 is prepared for each player (in other words for each user terminal 1500), and includes various types of data indicating the game implementation status. In other words, the play data 700 is second play information on the player related to the game, and serves as game implementation status management data.

Figure 16:
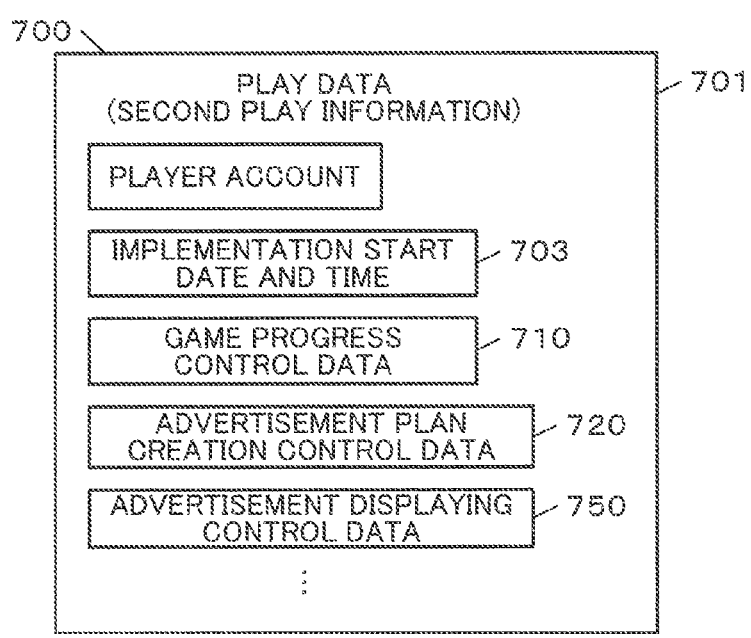
FIG. 16 is a diagram illustrating an example of a data structure of play data.

Specifically, one play data 700 includes a player account 701 including a user account of the player, execution start date and time 703, game progress control data 710, advertisement plan creation control data 720, and advertisement displaying control data 750 as illustrated in FIG. 16 for example. Note that data other than these can be included as appropriate.

The player account 701 indicates identification information and authentication information on the player allocated with the data.

The game progress control data 710 includes various types of data that are generated when the gameplay starts and describe gameplay progress statuses. The details of the data can be set as appropriate in accordance with the content of the game. For example, the data may be data including; a player character type; information on the current position in the game space; a list of ability parameter values of the character; an executed game progress unit indicating a game progress unit during the gameplay (for example, a stage, a scenario, a map, a time in the game world, or the like); a finished progress unit list indicating the finished units of the game progress units; an event occurrence history; and possessed item data. Note that data other than these can be included as appropriate. For example, a deck configuration list, the name of a song in a played game, a game difficulty setting, and the like may be included as appropriate in accordance with the details of the game.

The advertisement plan creation control data 720 is data for an operation for newly creating/changing an advertisement plan.

Figure 17:
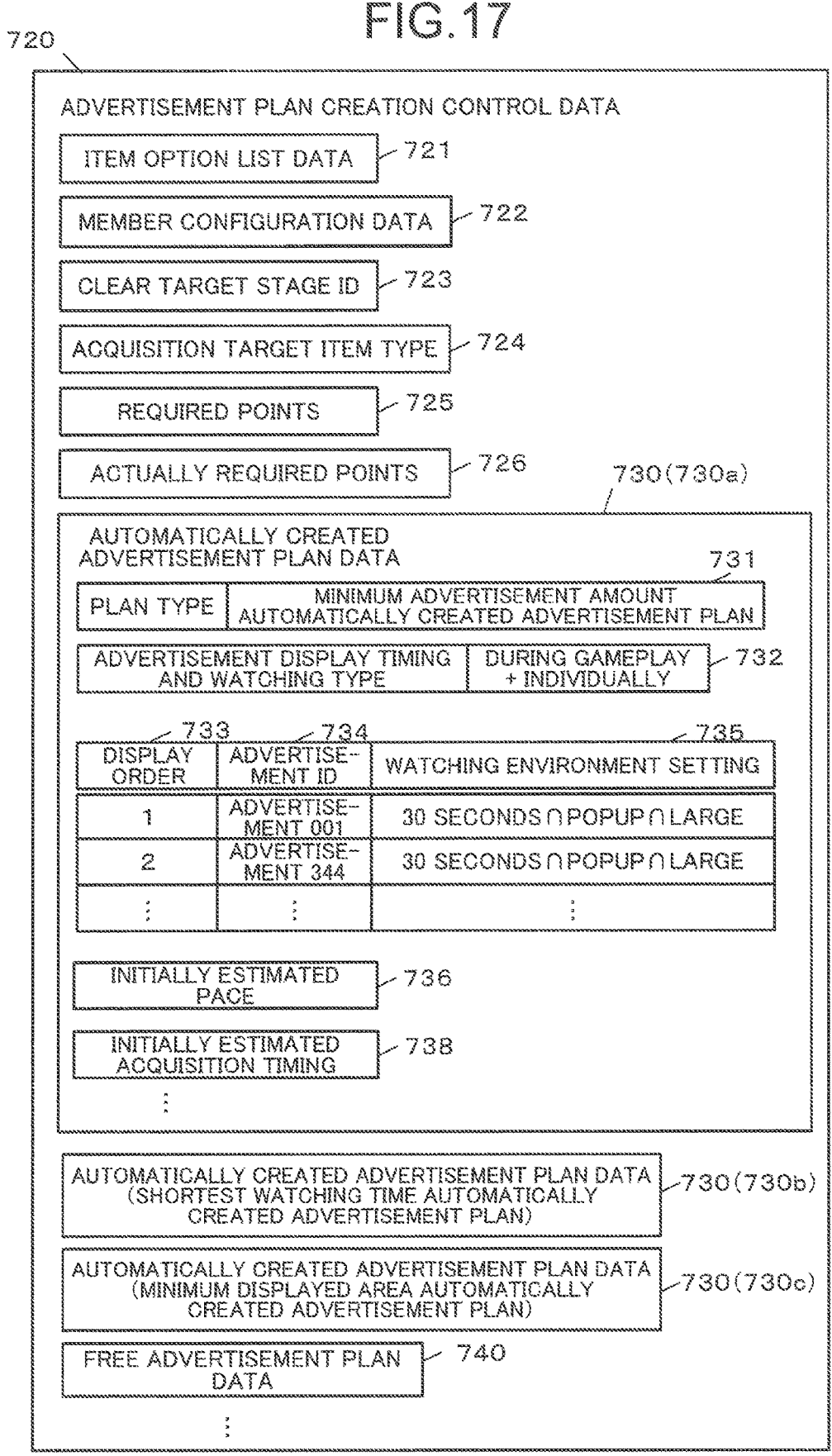
FIG. 17 is a diagram illustrating an example of a data structure of advertisement creation control data.

For example, as illustrated in FIG. 17, the advertisement plan creation control data 720 includes
1) item option list data 721,
2) member configuration data 722,
3) a clear target stage ID 723,
4) an acquisition target item type 724,
5) required points 725,
6) actually required points 726,
7) automatically created advertisement plan data 730 (730a, 730b, ... ), and
8) free advertisement plan data 740.
Note that data other than these can be included as appropriate.

The member configuration data 722 is a list of player accounts input using the scheduled play member input section 34b (see FIG. 5) to activate the guide display function when a plan is created.

The clear target stage ID 723 is stored as a stage ID input using the scheduled play stage input section 34c (see FIG. 5) to activate the guide display function when a plan is created.

The automatically created advertisement plan data 730 (730a, 730b, ... ) includes various types of data defining advertisement plans automatically created. One automatically created advertisement plan data 730 includes a plan type 731, an advertisement display timing and watching type 732, an advertisement ID 734 and watching environment setting 735 associated with the display order 733, an initially estimated pace 736, and an initially estimated acquisition timing 738. Note that data other than these can be included as appropriate.

The free advertisement plan data 740 includes various types of data defining a free advertisement plan, and has a data structure that is the same as that of the automatically created advertisement plan data 730.

Figure 18:
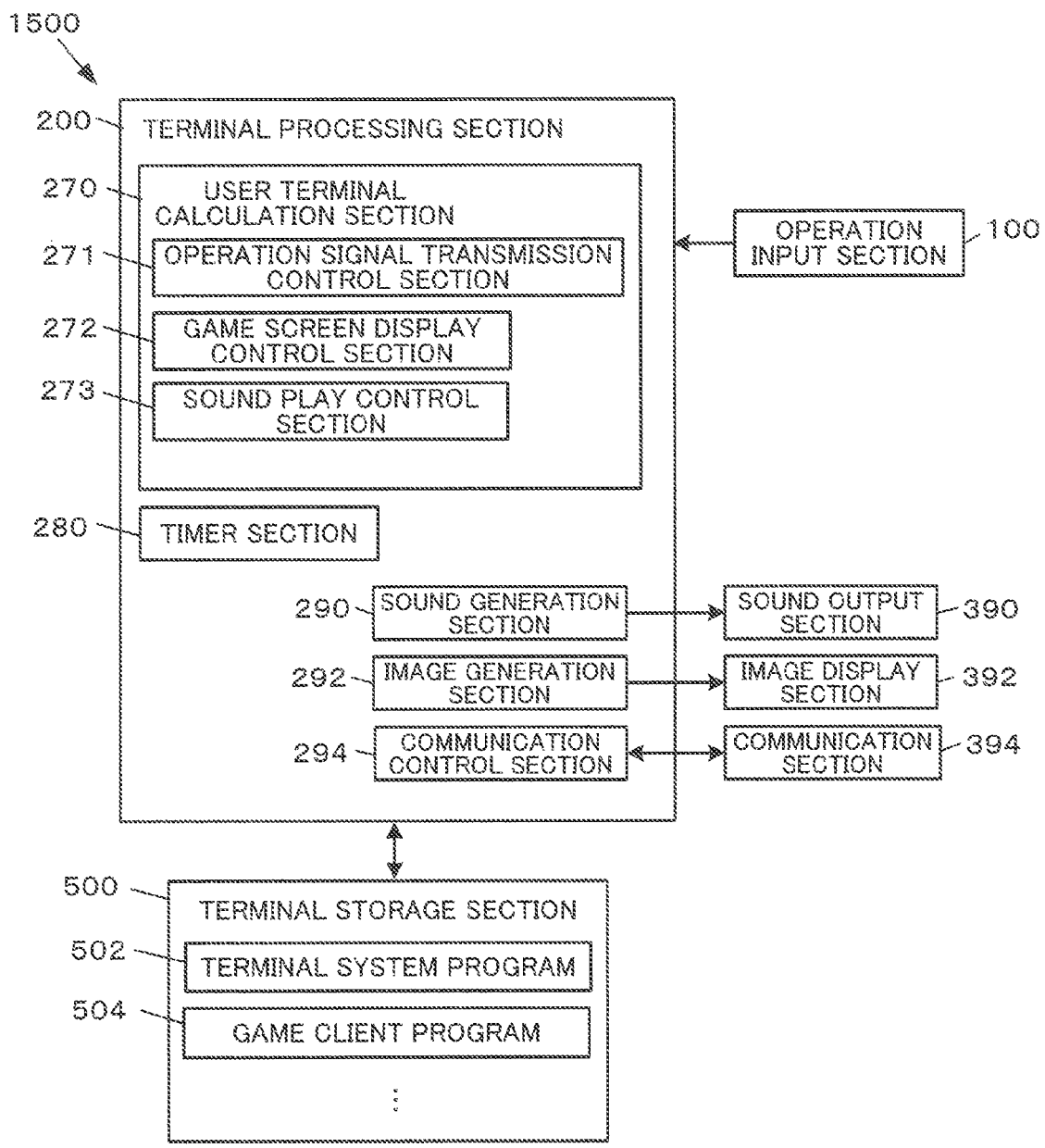
FIG. 18 is a functional block diagram illustrating an example of a functional configuration of a user terminal according to the first embodiment.

FIG. 18 is a functional block diagram illustrating an example of a functional configuration of the user terminal 1500 according to the present embodiment. The user terminal 1500 according to the present embodiment includes an operation input section 100, a terminal processing section 200, a sound output section 390, an image display section 392, a communication section 394, and a terminal storage section 500.

The operation input section 100 outputs an operation input signal, based on various operations input by the player, to the terminal processing section 200, and can be implemented with a push switch, a joystick, a touch pad, a track ball, an accelerometer, a gyro, a CCD module, or the like. The operation input section 100 corresponds to the arrow key 1502, the button switch 1504, and the touch panel 1506 in FIG. 1.

The terminal processing section 200 is implemented by electronic parts such as a processor (e.g., CPU and GPU), an ASIC, and an IC memory. The terminal processing section 200 performs input/output control to exchange data with each of the functional sections including the operation input section 100 and the terminal storage section 500. The terminal processing section 200 executes various calculation processes based on a predetermined program or data, the operation input signal from the operation input section 100, and various types of data received from the server system 1100 to control the operation of the user terminal 1500. The terminal processing section 200 corresponds to the control board 1550 in FIG. 1. The terminal processing section 200 according to the present embodiment includes a user terminal calculation section 270, a timer section 280, a sound generation section 290, an image generation section 292, and a communication control section 294.

The user terminal calculation section 270 include an operation signal transmission control section 271, a game screen display control section 272, and a sound play control section 273.

The operation signal transmission control section 271 performs a process of transmitting various types of data and a request to the server system 1100 in accordance with an operation on the operation input section 100.

The game screen display control section 272 performs control for displaying a game screen based on various types of data received from the server system 1100. In this configuration, the server system 1100 generates the image of the game screen. Alternatively, a configuration where the user terminal 1500 generates the image may also be employed. In this configuration, the game screen display control section 272 may be in charge of controlling an object disposed in a virtual three-dimensional space for generating a 3DCG for example.

The sound play control section 273 performs control to emit a sound (for example, sound effects, a BGM, words read by a voice actor, and the like) based on various types of sound data received from the server system 1100.

For example, the sound generation section 290 is implemented with a processor such as a DSP or a sound synthesizing IC, an audio codec for playing a sound file, or the like, and generates a sound signal for sound effects, a BGM, various types of operation sound, words read by a voice actor, and the like related to the game, and outputs the signal thus generated to the sound output section 390.

The sound output section 390 is implemented with a device that outputs sound such as sound effects or BGM, based on the sound signal received from the sound generation section 290. The sound output section 390 corresponds to the speaker 1510 in FIG. 1.

The image generation section 292 is implemented, for example, with a processor (e.g., a GPU or a DSP), a video signal IC, a program (e.g., video codec), a drawing frame IC memory (e.g., frame buffer), and the like.

The image generation section 292 generates a game screen (image) every frame (e.g., 1/60th of a second) based on the various types of data received from the server system 1100, and outputs the image signal of the generated game screen to the image display section 392.

The image display section 392 displays various game images based on the image signals input from the image generation section 292. For example, the image display section 392 may be implemented with an image display device such as a flat panel display, a cathode-ray tube (CRT), a projector, or a head-mounted display. The image display section 392 corresponds to the touch panel 1506 illustrated in FIG. 1 in the present embodiment.

The communication control section 294 performs a data process for data communications, and exchanges data with an external device through the communication section 394. The communication section 394 connects to the communication line 9 to implement communications. For example, the communication section 394 is implemented with a transceiver, a modem, a TA, a jack for a communication cable, a control circuit, and the like, and corresponds to the wireless communication module 1553 in FIG. 1.

The terminal storage section 500 stores therein a system program for implementing various functions for causing the terminal processing section 200 to entirely control the user terminal 1500, a program and various types of data required for the gameplay, and the like. The terminal storage section 500 is used as a work area for the terminal processing section 200, and temporarily stores a result of calculation performed by the terminal processing section 200 in accordance with various programs, input data received from the operation input section 100, and the like. These functions are implemented with an IC memory (e.g., RAM and ROM), a magnetic disk (e.g., hard disk), an optical disk (e.g., CD-ROM and DVD), or the like. The terminal storage section 500 corresponds to the IC memory 1552 and the memory card 1540 in the control board 1550 illustrated in FIG. 1.

The terminal storage section 500 according to the present embodiment stores therein a terminal system program 502 and a game client program 504. Note that other data can be included as appropriate.

The terminal system program 502 is a program for causing the user terminal 1500 to implement a basic input/output function of a computer.

The game client program 504 is application software that implements a function of the user terminal calculation section 270 when read and executed by the terminal processing section 200, and may be embedded as a part of the terminal system program 502. In the present embodiment, the game client program 504 is a copy of the distributed game client program 505 (see FIG. 11) provided from the server system 1100.

The game client program 504 may be implemented with a dedicated client program or with a web browser program and a plugin that implements an interactive image display, depending on a technique and a method for implementing an online game.

[Process]

Next, a process performed by the game system 1000 is described.

Figure 19:
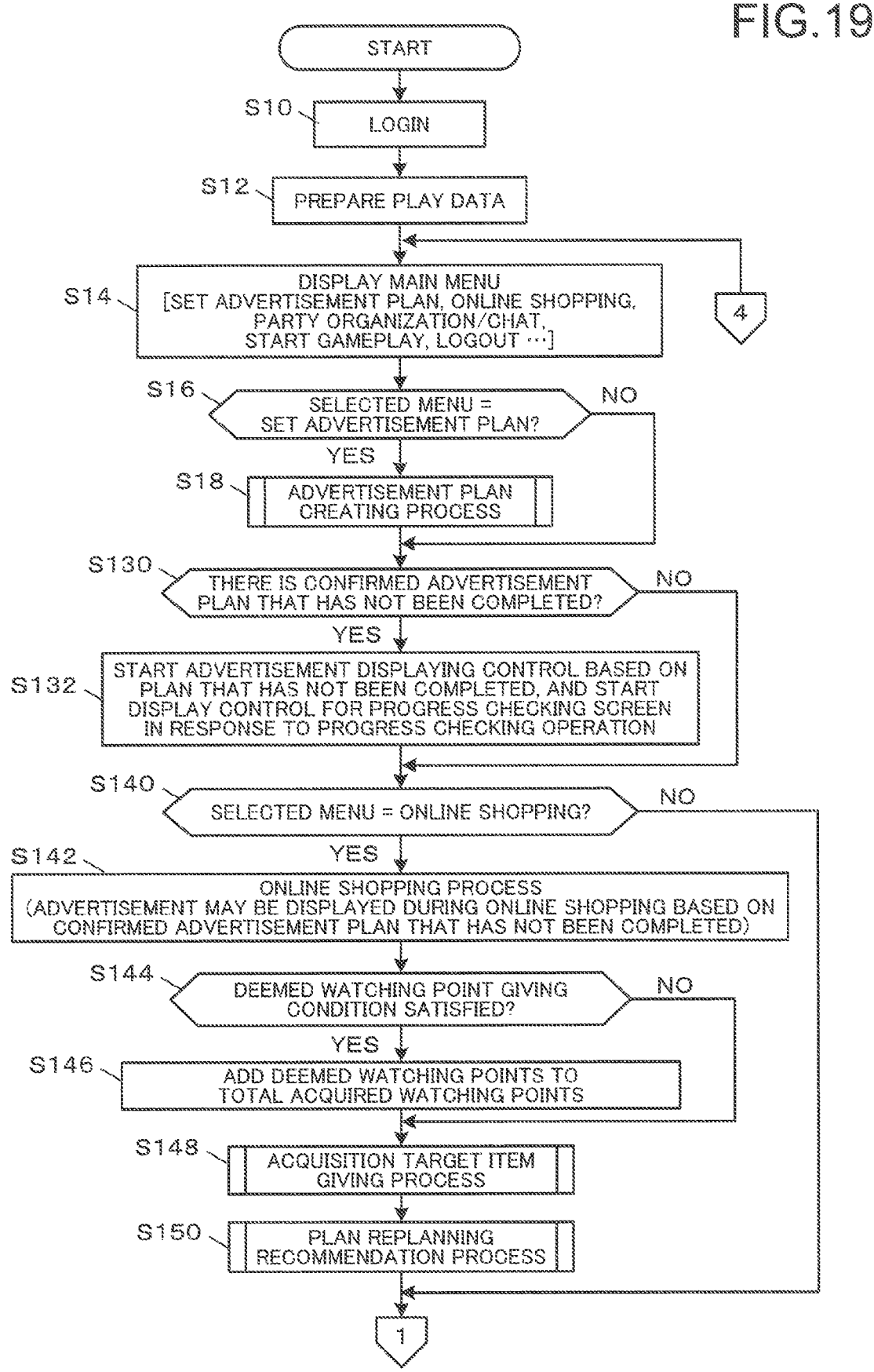
FIG. 19 is a flowchart illustrating a flow of a process in the server system according to the first embodiment.
Figure 20:
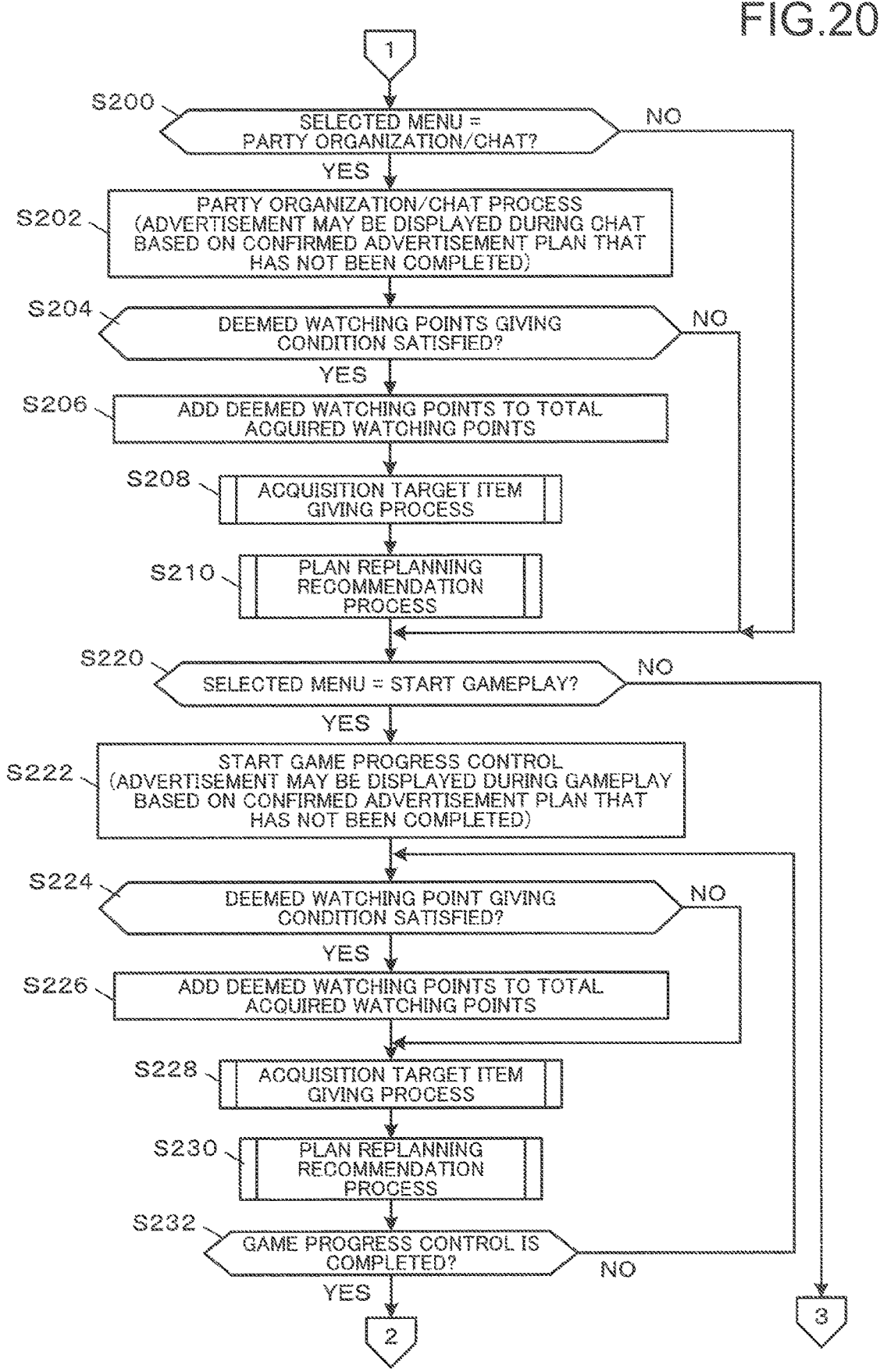
FIG. 20 is a flowchart continuing from FIG. 19.
Figure 21:
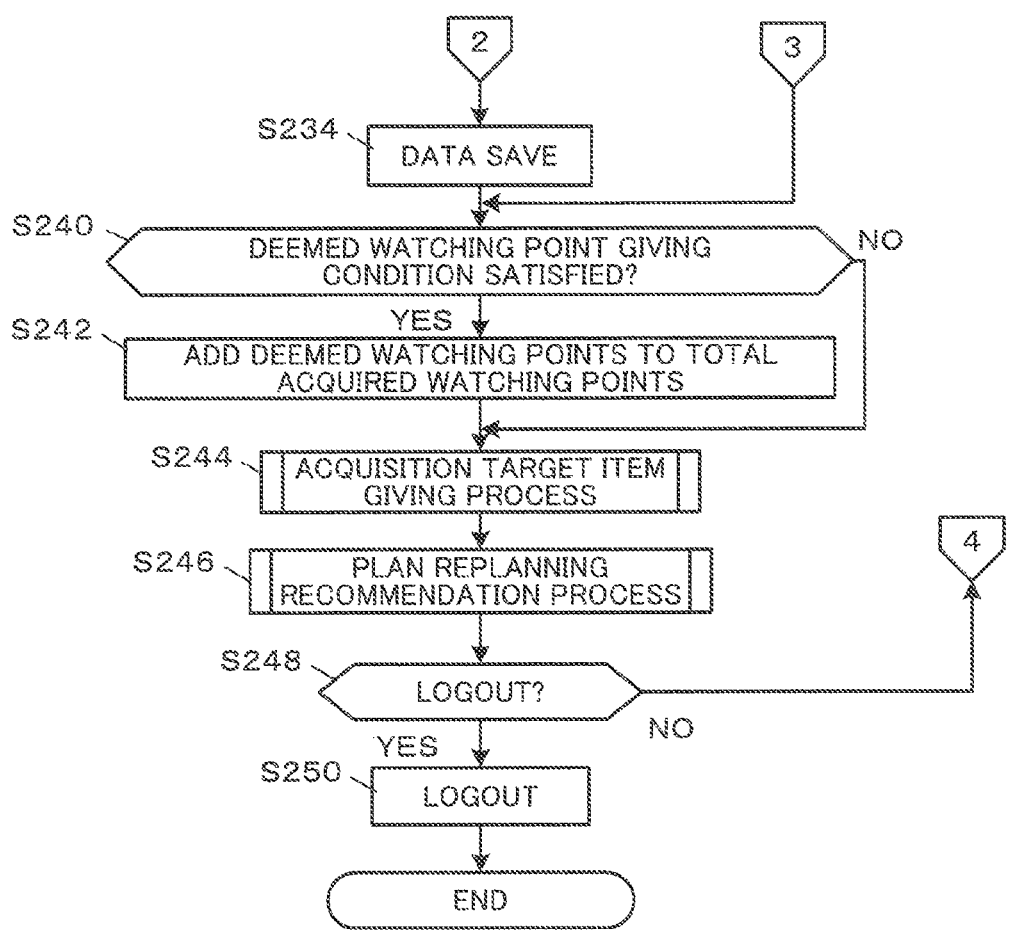
FIG. 21 is a flowchart continuing from FIG. 20.

FIG. 19 to FIG. 21 are each a flowchart illustrating a flow of a process in the server system 1100 according to the present embodiment, from login to logout performed by a player by operating his or her user terminal 1500. The flow of the process described herein is implemented with the server processing section 200s executing the server program 503.

In the user terminal 1500, a game program according to the present embodiment, that is, the game client program 504 is assumed to have been started to be executed with the game play start operation by the player and thus is assumed to have been booted.

First of all, the server system 1100 executes a login process in accordance with a request from the user terminal 1500 (step S10). Then, the play data 700 is prepared (step S12). At this point, the gameplay has not technically started yet, and thus the game progress control data 710 is not generated in the play data 700 (FIG. 16). The creating of an advertisement plan has not stated yet and thus the advertisement plan creation control data 720 is not generated. The advertisement displaying has not started yet, and thus the advertisement displaying control data 750 is not generated.

Next, the server system 1100 causes the user terminal 1500 to display the main menu (step S14). In the present embodiment, the main menu includes items such as "advertisement play setting", "online shopping", "party organization/chatting", "gameplay start", and "logout". Note that items other than these (such as friend registration) may be included as appropriate.

When "advertisement play setting" is selected on the main menu of the user terminal 1500, the user terminal 1500 transmits a request corresponding to the selected menu item to the server system 1100.

Upon receiving the request for "advertisement play setting" (YES in step S16), the server system 1100 performs an advertisement plan creating process (step S18).

Figure 22:
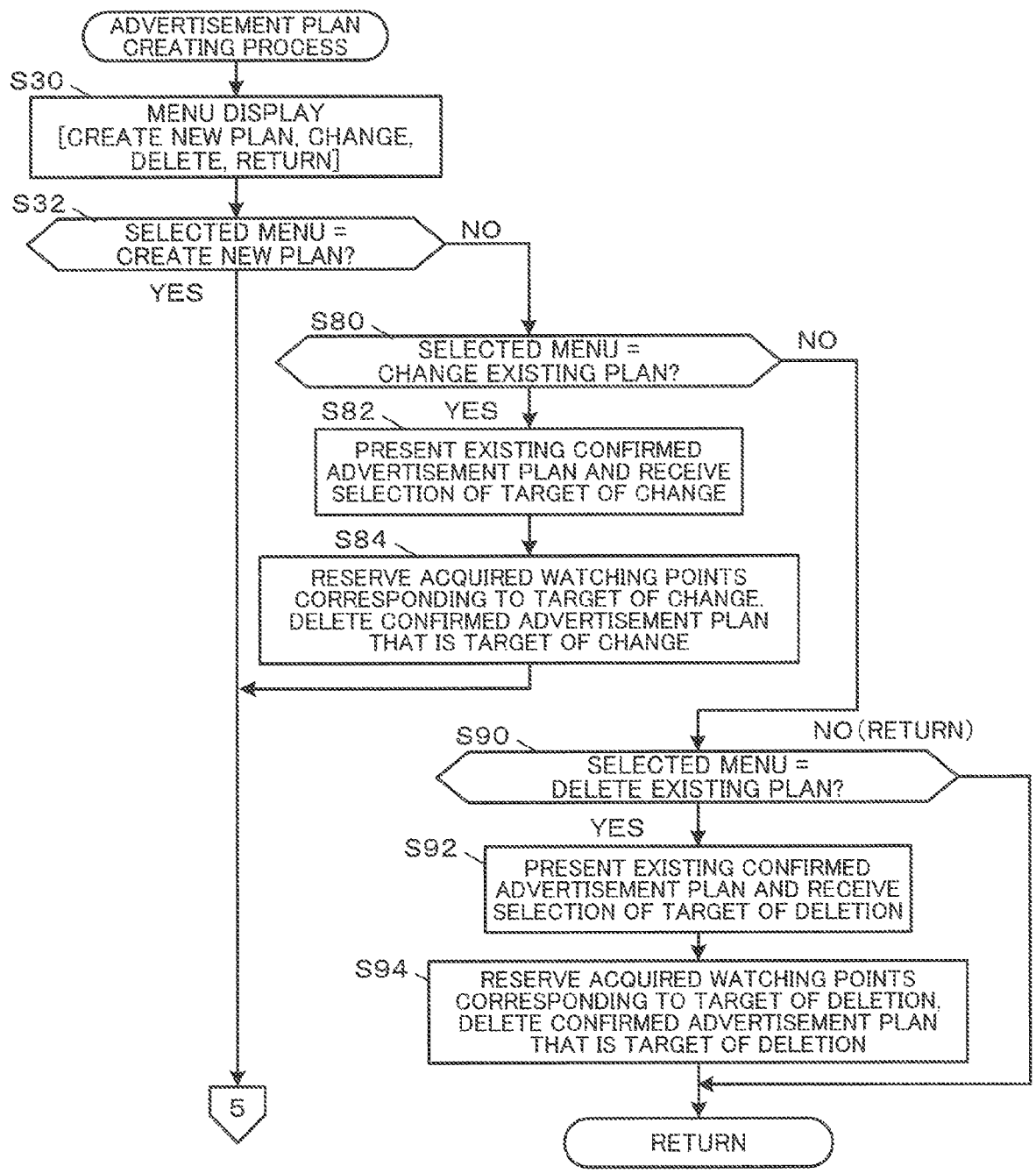
FIG. 22 is a flowchart illustrating a flow of an advertisement plan creating process.
Figure 23:
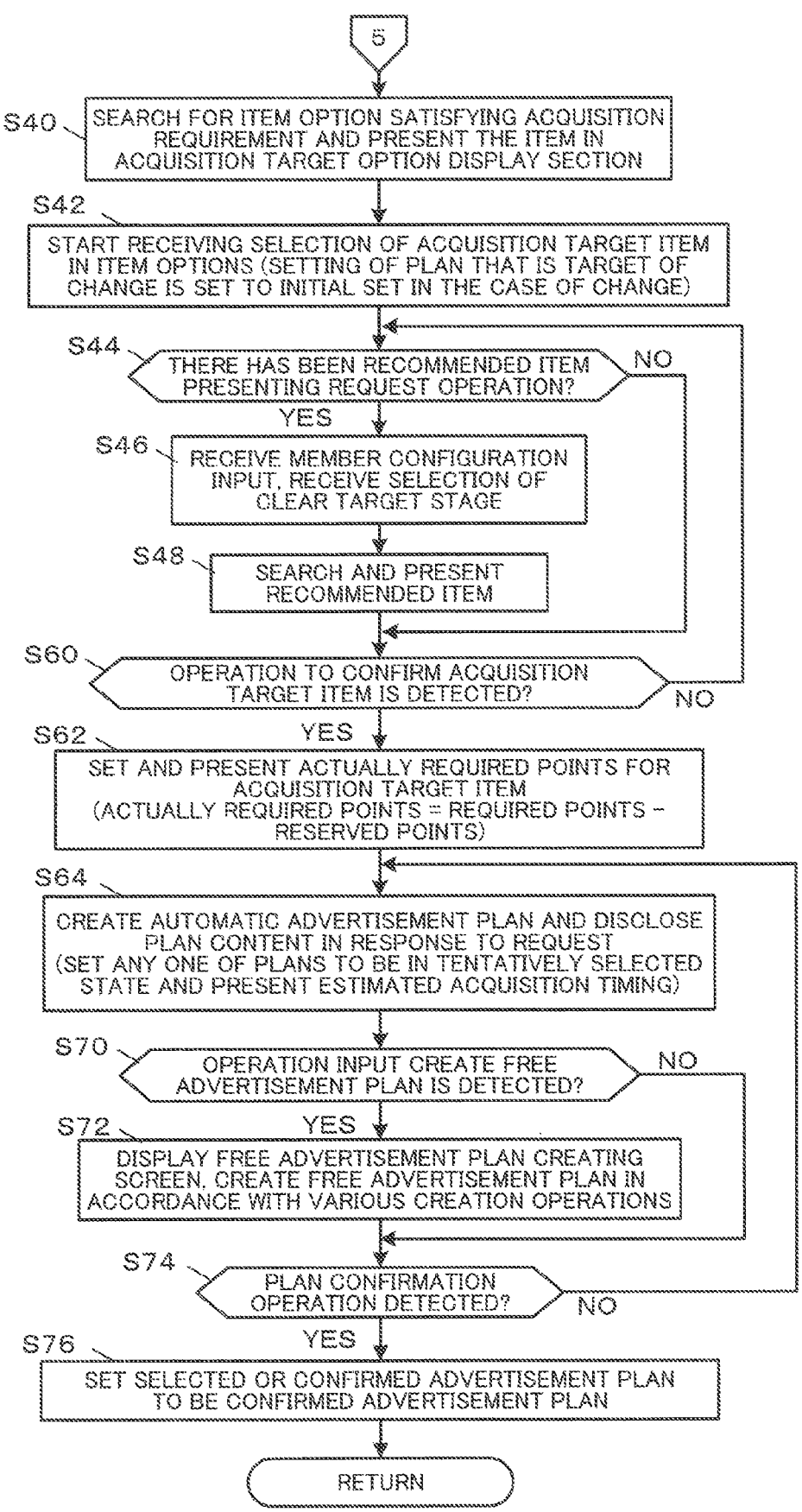
FIG. 23 is a flowchart continuing from FIG. 22.

FIG. 22 and FIG. 23 are each a flowchart illustrating a flow of the advertisement plan creating process according to the present embodiment. As illustrated in FIG. 22, in the process, the server system 1100 first causes the user terminal 1500 to display the plan menu screen W4 (see FIG. 4) (step S30).

When "create new plan" is selected on the plan menu screen W4 (YES in step S32), the process proceeds to FIG. 23, and the server system 1100 causes the user terminal 1500 to display the new plan creation screen W6 (see FIG. 5).

Specifically, the server system 1100 searches for an item option satisfying an acquirable condition by referring to the item defining data 512 (see FIG. 11), and stores the option in the item option list data 721 in the advertisement plan creation control data 720 (see FIG. 17). Then, the item option thus found in the search is presented on the acquisition target option display section 30 in the new plan creation screen W6 (step S40). Then, selection of the acquisition target item 10 from such item options starts to be received (step S42). Specifically, the server system 1100 updates the acquisition target item type 724 in the advertisement plan creation control data 720 (see FIG. 17) each time the operation to select the acquisition target item 10 is detected until the operation to confirm the acquisition target item is input, and thus refers to the item defining data 512 corresponding to the item to update the required points 725. Then, what is displayed in the acquisition target item display section 32 in the new plan creation screen W6 is updated.

In this process, if the display switching operation section 34a has been operated to be "ON" in the guide display setting section 34 (see FIG. 5), the server system 1100 determines that there has been a recommended item presenting request operation (YES in step S44), and activates the scheduled play member input section 34b and the scheduled play stage input section 34c. Thus, the member configuration input and clear target stage selection can be received (step S46). Results of such inputs are stored in the member configuration data 722 and the clear target stage ID 723 in the advertisement plan creation control data 720 (see FIG. 17).

The server system 1100 searches for the recommended item, corresponding to the member configuration input and the clear target stage selection, and presents the item thus found to the player (step S48). Specifically, the server system 1100 refers to the playing guide data 550 (see FIG. 13) in the clear target stage ID 551 matching the clear target stage ID 723, and reads out a recommended item list from the recommended item setting table data 553. Then, the server system 1100 refers to the possessed item list 615 (see FIG. 14) in the user management data 600 on the player, and searches for the recommended items that have been found for an item not possessed by the player. The item thus found is displayed in a display field for such an item in the acquisition target option display section 30, while being highlighted by being provided with the guide marker 35 (see FIG. 5).

When the operation to confirm the acquisition target item 10 on the new plan creation screen W6 is detected (YES in step S60), the server system 1100 sets and presents the actually required points 726 for the acquisition target item 10 (step S62, see FIG. 17). The value of the actually required points 726 is a result of subtracting the reserved points 670 (see FIG. 14) from the required points 725 for the acquisition target item 10. Thus, the reserved points 670 (see FIG. 14) is consumed. Then, the actually required points 726 are presented to the player, on the actually required points details display section 40 (see FIG. 5) in the new plan creation screen W6. The actually required points 726 are of a value larger than "0".

Then, the server system 1100 creates automatically created advertisement plans, and discloses the content of the automatically created advertisement plans when required (step S64). In the present embodiment, three automatically created advertisement plans including the minimum advertisement amount automatically created advertisement plan, the shortest watching time automatically created advertisement plan, and the minimum displayed area automatically created advertisement plan are each created based on a predetermined algorism. As a result, the automatically created advertisement plan data 730 is generated for each of the plans, in the advertisement plan creation control data 720 (see FIG. 17).

For example, the minimum advertisement amount automatically created advertisement plan is created as follows. First of all, the advertisement display timing and watching type 732 is automatically selected in such a manner that the advertisement display timing most frequently arrives in one gameplay, based on the expected advertisement displayed times data 530 in the advertisement database 518 (see FIG. 12).

Then, for the advertisement ID 734 and the watching environment setting 735, first of all, advertisements in the advertisement database 518 are sorted to be in the descending order of the watching points 528b defined in the watching point defining data 528 in the advertisement defining data 520 (see FIG. 12). Next, the advertisements are selected one by one from the top of the sorted order until the actually required points 726 for the acquisition target item 10 is reached. Then, the advertisement ID 522 and the watching environment 528a of the advertisement thus selected are respectively set to the advertisement ID 734 and the watching environment setting 735.

For the initially estimated pace 736, the number of advertisement displaying times per gameplay, corresponding to the advertisement display timing and watching type 732, is read out from the expected advertisement displayed times data 530.

For example, when "four times/play" is read out, it means that the advertisement displaying is performed four times in one gameplay per day. Thus, the initially estimated pace 736 (in a unit of P/play/day) is obtained as a result of dividing the sum of the watching points 528b of the advertisements registered in the advertisement ID 734 by "4".

The initially estimated pace 736 may not be obtained by an estimated value of the expected advertisement displayed times data 530. Instead, the total watching points acquisition pace 672 in the management data 600 on the player may be directly used. Alternatively, the watching point giving history data 665 (see FIG. 15) may be held for each player, without being deleted even after the plan has been completed, and the latest estimated pace may be statistically obtained from the data in each occasion.

The initially estimated acquisition timing 738 is obtained by dividing the actually required points 726 for the acquisition target item 10 by the initially estimated pace 736.

Then, the server system 1100 sets the minimum advertisement amount automatically created advertisement plan to be tentatively selected, and presents the initially estimated pace 736 and the initially estimated acquisition timing 738 of the tentatively selected plan to the player, in the estimation display section 42 (see FIG. 5) in the new plan creation screen W6.

When an operation on any one of the automatically created advertisement plan displaying operation icons 44 on the new plan creation screen W6 is detected, the server system 1100 determines that there has been a request to display the plan. Thus, the server system 1100 changes the tentative setting to the automatically created advertisement plan, corresponding to the operated icon, updates what is displayed in the estimation display section 42, and makes the setting details (the content of each item in the automatically created advertisement plan data 730, see FIG. 17) displayed as a popup.

Referring back to FIG. 23, when an operation input to create a free advertisement plan is detected on the new plan creation screen W6 (YES in step S70), the server system 1100 causes the user terminal 1500 to display the free advertisement plan creating screen W8 (see FIG. 6), and receives an operation input to select each setting item (step S72). As a result, the free advertisement plan data 740 is generated in the advertisement plan creation control data 720 (see FIG. 17). The server system 1100 sets the tentative setting to the free advertisement plan, and updates what is displayed in the estimation display section 42 in the new plan creation screen W6.

When the operation input to confirm the predetermined plan is detected with the automatically created advertisement plan or the free advertisement plan tentatively set in the new plan creation screen W6 (YES in step S74), the server system 1100 sets the tentatively set plan to be the newly confirmed advertisement plan (step S76).

Specifically, the server system 1100 generates new confirmed advertisement plan management data 630 in the advertisement save data 620 (see FIG. 14) in the user management data 600 on the player.

Specifically, this process includes
1) copying the acquisition target item type 724 and the actually required points 726 in the advertisement plan creation control data 720 on the confirmed advertisement plan to be the acquisition target item type 635 and the actually required points 637, respectively,
2) copying the advertisement display timing and watching type 732, in the same advertisement plan creation control data 720, to be the advertisement display timing and watching type 639,
3) copying the display order 733, the advertisement ID 734, and the watching environment setting 735, in the same advertisement plan creation control data 720 to be the display order 640, the advertisement ID 642, and the watching environment setting 644, respectively, 4) copying the initially estimated pace 736 and the initially estimated acquisition timing 738, in the same advertisement plan creation control data 720, to be the initially estimated pace 646 and the initially estimated acquisition timing 648, respectively, 5) storing predetermined values, not determined at this point, in the display start date and time 661 and the display completed advertisement ID list 663, 6) not generating the watching point giving history data 665 at this point, 7) setting the total acquired watching points 667 to be "0", and 8) storing a predetermined value, not determined at this point, in the point acquisition pace 669.

When the new confirmed advertisement plan management data 630 is generated in the user management data 600, the server system 1100 terminates the advertisement plan creating process.

Referring back to FIG. 22, when "change existing plan" is selected in the plan menu screen W4 (YES in step S80), the server system 1100 presents a list of advertisement plans that have been confirmed, and receives an operation to select a target of the change (step S82). Then, the total acquired watching points 667 related to the confirmed advertisement plan set to be the change target are added to the reserved points 670, and the plan is deleted, that is, the confirmed advertisement plan management data 630 is deleted (step S84, see FIG. 14). Then, the process proceeds to step S40 (see FIG. 23).

When "delete existing plan" is selected in the plan menu screen W4 (YES in step S90), the server system 1100 presents the list of advertisement plans that have been confirmed, and receives an operation to select a target of the deletion (step S92). Then, the acquired watching points related to the confirmed advertisement plan set to be the deletion target are added to the reserved points 670 and the confirmed advertisement plan management data 630 on the plan is deleted (step S94). Thus, the advertisement plan creating process is terminated.

Referring back to FIG. 19, when there is a confirmed advertisement plan that has not been completed (YES in step S130), the server system 1100 starts the advertisement displaying control based on the plan, and starts the display control for the progress checking screen W10 (see FIG. 7) in response to a progress checking operation (step S132).

When the advertisement displaying is executed, the advertisement displaying control data 750 is generated as appropriate (see FIG. 16), and the watching point giving history data 665, the total acquired watching points 667, the point acquisition pace 669, and the total watching points acquisition pace 672 (see FIG. 14) in the corresponding confirmed advertisement plan management data 630 (see FIG. 15) is updated as appropriate. In the present embodiment, when there are a plurality of confirmed advertisement plans that have not been completed, the plan with the earliest confirmed date and time 633 is selected to be executed. Note that all of the plurality of confirmed advertisement plans that have not been completed may be executed, or a predetermined number of such plans may be randomly selected to be executed.

The period during which the main menu is displayed corresponds to the advertisement display timing type "before gameplay". Thus, an advertisement based on a plan with the advertisement display timing and watching type 639 (see FIG. 15) set to be "before gameplay" may be displayed while the main menu is being displayed.

When the item "online shopping" is selected in the main menu (YES in step S140), the server system 1100 performs an online shopping process (step S142).

A period during the online shopping corresponds to the advertisement display timing type "before gameplay", and thus an advertisement based on a plan with the advertisement display timing and watching type 639 (see FIG. 15) set to be "before gameplay" may be displayed during the online shopping. When the player has played game after the current login, this period also corresponds to "after gameplay". Thus, an advertisement based on a plan with the advertisement display timing and watching type 639 may also be displayed during the online shopping.

The server system 1100 refers to the deemed watching point setting data 540 also during the online shopping. When a condition for giving the deemed watching points is satisfied (YES in step S144), the server system 1100 gives the deemed watching points to the player (step S146). Specifically, the watching point giving history data 665 corresponding to the point is added to the confirmed advertisement plan management data 630 in the plan with which the advertisement displaying is executed. Then, the total acquired watching points 667, the point acquisition pace 669, and the total watching points acquisition pace 672 are updated.

Next, the server system 1100 performs an acquisition target item giving process (step S148).

Figure 24:
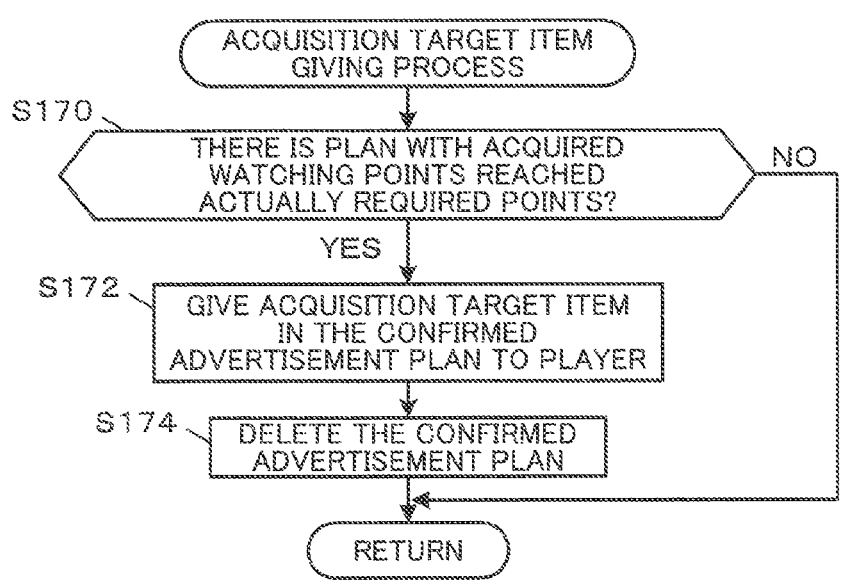
FIG. 24 is a flowchart illustrating a flow of an acquisition target item giving process.

FIG. 24 is a flowchart illustrating a flow of the acquisition target item giving process.

In this process, the server system 1100 searches the confirmed advertisement plan management data 630 (see FIG. 15) for a plan with the total acquired watching points 667 that have reached the actually required points 637. When such a plan is found (YES in step S170), the server system 1100 additionally registers an acquisition target item in the plan to the possessed item list in the game progress control data 710 in the play data 700 or the possessed item list 615 (see FIG. 14) in the user management data 600, and gives the item to the player (step S172).

Next, the server system 1100 deletes the confirmed advertisement plan management data 630 on the corresponding plan (step S174), and the acquisition target item giving process is terminated.

Referring back to FIG. 19, the server system 1100 than performs a plan replanning recommendation process (step S150).

Figure 25:
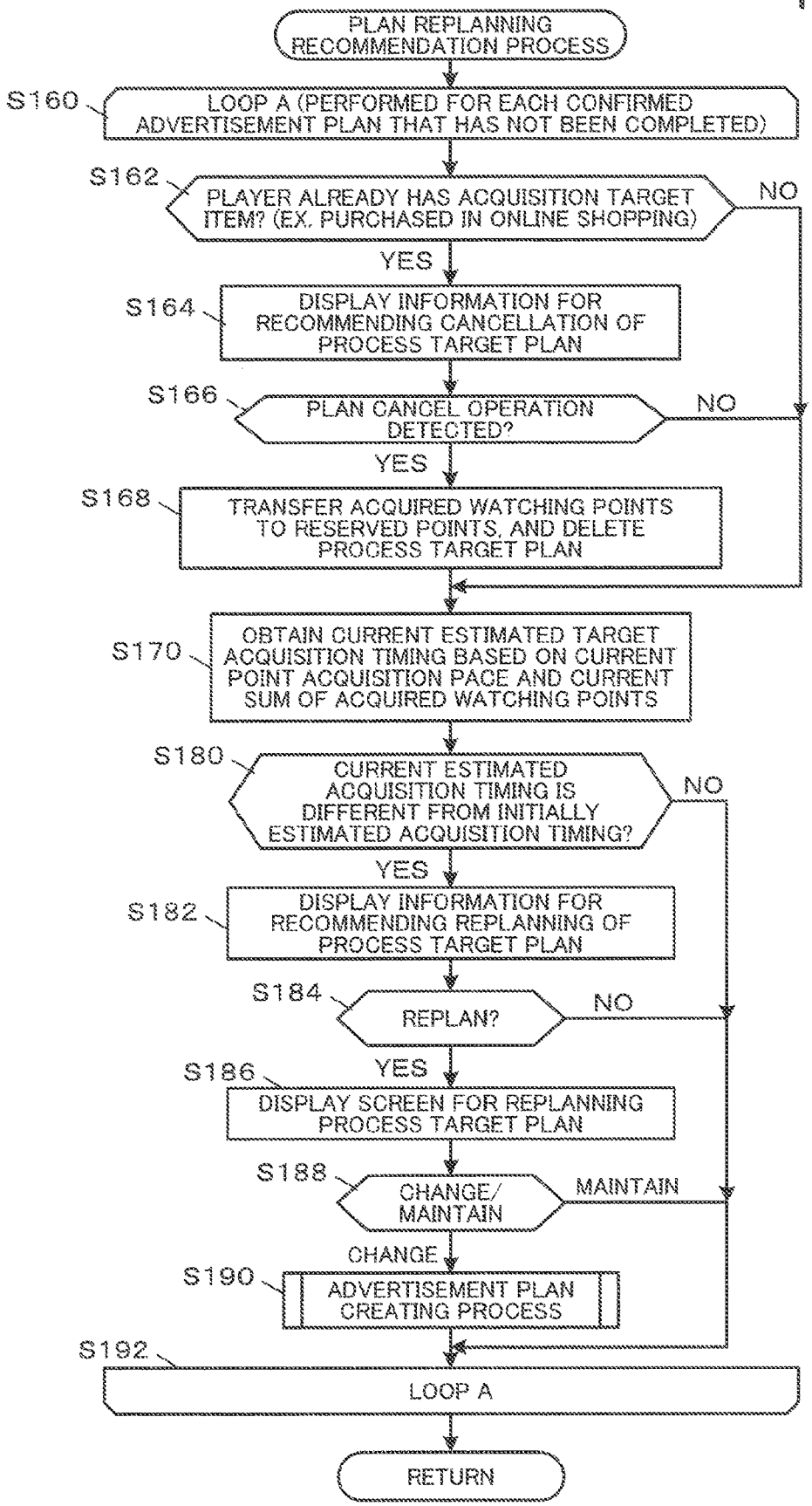
FIG. 25 is a flowchart illustrating a flow of a plan replanning recommendation process.

FIG. 25 is a flowchart illustrating a flow of the plan replanning recommendation process.

In the process, the server system 1100 executes a loop A for each confirmed advertisement plan that has not been completed (steps S160 to S192).

First of all, in the loop A, when the acquisition target item 10 in the process target plan has already been acquired by the user through purchasing in the online shopping (YES in step S162), the server system 1100 causes the user terminal 1500 to display the plan replanning recommendation screen for recommending the user to stop the process target plan (see FIG. 8A and FIG. 8B), and receives selection to stop/not to stop in the screen (step S164).

When stop is selected (YES in step S166), the server system 1100 transfers the total acquired watching points 667 in the confirmed advertisement plan management data 630 (see FIG. 15) in the process target plan to the reserved points 670 (see FIG. 14), and deletes the confirmed advertisement plan management data 630 on the process target plan (step S168).

Next, the server system 1100 obtains a currently estimated acquisition timing based on the total acquired watching points 667 and the point acquisition pace 669 in the confirmed advertisement plan management data 630 (see FIG. 15) on the process target plan (step S170).

The currently estimated acquisition timing thus obtained is compared with the initially estimated acquisition timing 648. When a difference therebetween is equal to or larger than a threshold value (for example, two days or more) (YES in step S180), the server system 1100 displays the replanning recommendation screen W11 for recommending to the user to replan the process target plan (step S182, see FIG. 8A and FIG. 8B).

When an operation to select "replan" is detected in the replan recommendation screen W11 (YES in step S184), the server system 1100 displays the plan reconfiguration screen W12 for the process target plan (step S186, see FIG. 9).

When an operation to select "maintain plan" by the player who has reviewed the process target plan is detected in the plan replanning screen W12 (maintain in step S188), the server system 1100 terminates the loop A. On the other hand, when the player performs an operation to select "change plan" in the plan replanning screen W12 (change in step S188), the server system 1100 performs the advertisement plan creating process to enable the player to change the plan (step S190), and terminates the loop A (step S192).

When the loop A is completed for all of the confirmed advertisement plans, the server system 1100 terminates the plan replanning recommendation process.

Then, the process proceeds to the flowchart in FIG. 20. When "party organization/chat" is selected on the user terminal 1500, the user terminal 1500 transmits a request corresponding to the menu item thus selected to the server system 1100.

Upon receiving the request related to "party organization/chat" (YES in step S200), the server system 1100 executes a party organization/chat process (step S202).

The game according to the present embodiment, which is an online-multi-play ARPG, enables the player to chat with other players and organize a party for gameplay.

A period during which a party is organized or the player is chatting corresponds to the advertisement display timing type "before gameplay". Thus, an advertisement in a plan with the advertisement display timing and watching type 639 (see FIG. 15) set to be "before gameplay" may be displayed while the player is organizing a party or chatting. When the gameplay has been performed after the current login, the period also corresponds to the "after gameplay", and thus, an advertisement in a plan with the advertisement display timing and watching type 639 set to be "after gameplay" may also be displayed.

The server system 1100 refers to the deemed watching point setting data 540 even during the party organization and chatting. When the deemed watching point giving condition is satisfied (YES in step S204), the server system 1100 gives the deemed watching points to the player (step S206). The server system 1100 performs the acquisition target item giving process (step S208), and performs the plan replanning recommendation process (step S210).

When "start gameplay" is selected in the main menu of the user terminal 1500, the user terminal 1500 transmits a request corresponding to the selected menu item to the server system 1100.

Upon receiving the request related to "start gameplay" (YES in step S220), the server system 1100 reads out the game save data 610 (see FIG. 15) from the user management data 600, prepares the game progress control data 710 (FIG. 16) in the play data 700, and performs the game progress control (step S222).

A period during which the game progresses corresponds to the advertisement display timing type "during gameplay". Thus, an advertisement in a plan with the advertisement display timing and watching type 639 (see FIG. 15) is set to be "during game" may be displayed during the gameplay.

Note that the server system 1100 refers to the deemed watching point setting data 540 while the game progress control is in process. When the deemed watching point giving condition is satisfied (YES in step S224), the server system 1100 gives the deemed watching points to the player (step S226).

Then, the server system 1100 performs the acquisition target item giving process (step S228) and performs the plan replanning recommendation process (step S230).

When the game progress control is completed (YES in step S232), the server system 1100 updates the game save data 610 in the user management data 600 (step S234, FIG. 21).

Then, the server system 1100 refers to the deemed watching point setting data 540. When the deemed watching point giving condition is satisfied (YES ins step S240), the server system 1100 gives the deemed watching points to the player (step S242).

Then, the server system 1100 performs the acquisition target item giving process (step S244) and performs the plan replanning recommendation process (step S246).

When "logout" is selected in the main menu of the user terminal 1500, the user terminal 1500 transmits a request corresponding to the selected menu item to the server system 1100.

Upon receiving the request related to "logout" (YES in step S248), the server system 1100 performs a process related to logout (step S250), and the series of processes is terminated.

In the present embodiment described above, when the player designates an item he or she wants in advance, the advertisement plan that is a reasonable cost is created. Thus, a novel reward advertisement that is watched based on the plan can be achieved.

Thus, the player can be much more incentivized to watch the advertisement than in cases with the conventional reward advertisement, such as a case where the content of the reward is unknown until the reward is actually given and a case where the same reward is given over and over again with the same advertisement.

An advertisement with low incentive is likely to be less effective. In the present embodiment, the player is motivated to entirely watch the displayed advertisement in the plan because he or she gets the desired item in return. Thus, the advertisement with the same content is excepted to be more appealing.

The advertisement plan is automatically created to be suitable for various conditions. Thus, the player can simply select a plan closest to the desired condition. This ensures high usability. Note that the free advertisement plan, enabling the player to select an advertisement, can be created. Thus, a novel reward advertisement can be achieved based on the concept of "the player selecting and watching the advertisement the player is interested in and getting a desired item", which is advantageous to both advertisement sponsor and advertisement watcher.

When the advertisement plan is created, an estimated acquisition timing, which is an estimated timing at which the acquisition target item can be acquired and obtained based on the watching points acquisition pace, can be presented to the player. Thus, the plan is more likely to be acceptable. This point also contributes to more incentivize the player to entirely watch the advertisement.

The estimated acquisition timing of a plan which has been created might be delayed from the first estimated timing. The configuration described above has a function of recommending replanning including abortion of the plan. Thus, user friendly advertisement provision is implemented. The advertisement provided might decrease as a result of the replanning Still, recommendation for the plan change based on the player status leads to the player watching the advertisement with a positive impression.

Second Embodiment

Next, a second embodiment of the present invention is described.

The present embodiment is implemented to be basically the same with the first embodiment, but is different from the first embodiment in that the user terminal 1500 performs the game management process. Components that are the same as the counterparts in the first embodiment are denoted with the same reference numerals, and the description thereof will be omitted.

Figure 26:
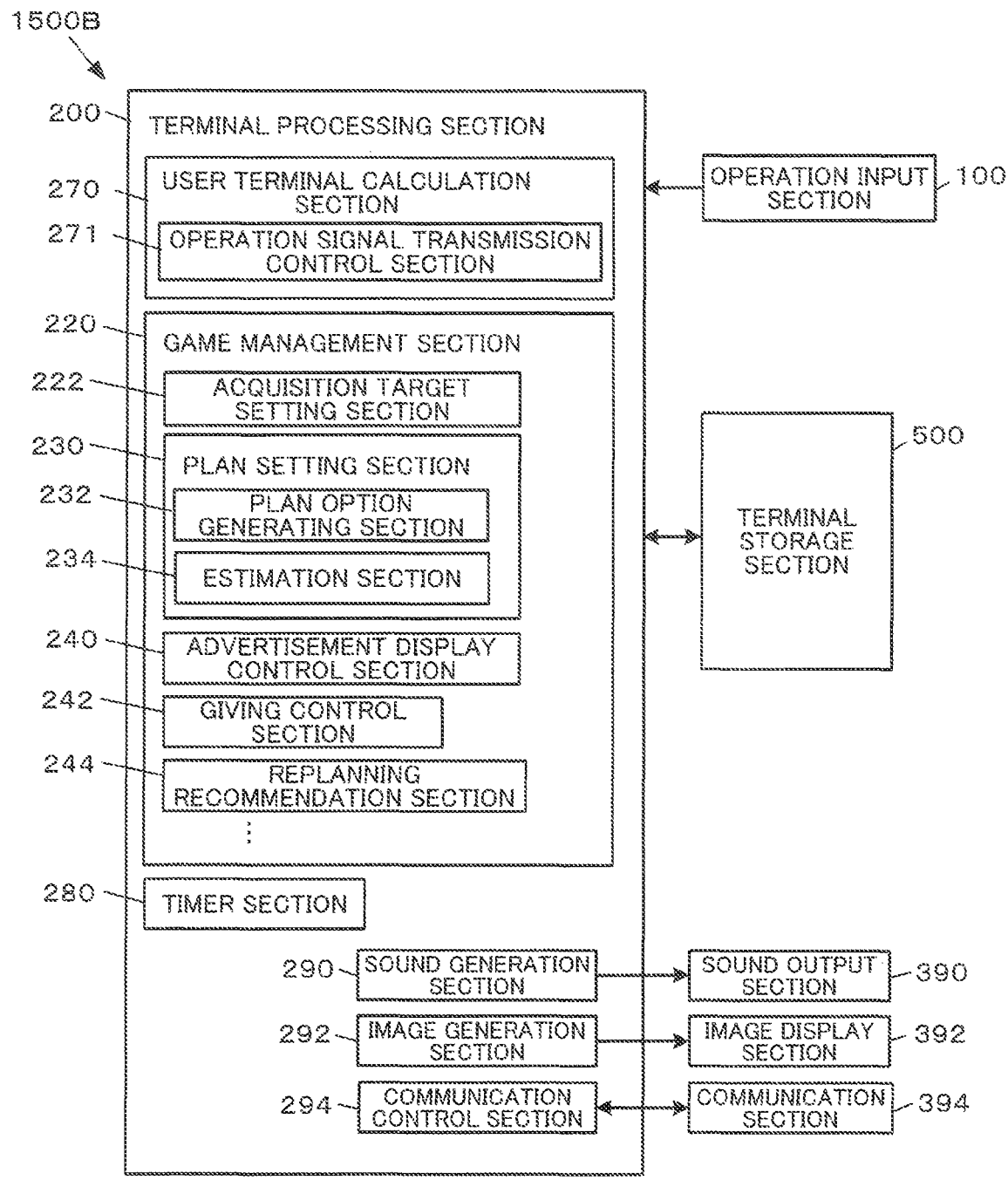
FIG. 26 is a functional block diagram illustrating an example of a functional configuration of a user terminal according to a second embodiment.

FIG. 26 is a functional block diagram illustrating an example of a functional configuration of a user terminal 1500B according to the present embodiment. The user terminal 1500B according to the present embodiment is a computer system in which the game screen display control section 272 and the sound play control section 273 are omitted and the game management section 220 is provided instead. Specifically, the user terminal 1500B according to the present embodiment does not acquire data for displaying a game screen image or data for playing sounds from the server system 1100, but performs a calculation process related to the game management to perform the game progress control, and thus generates images of the game screen and an advertisement and controls the sound play therefor.

Figure 27:
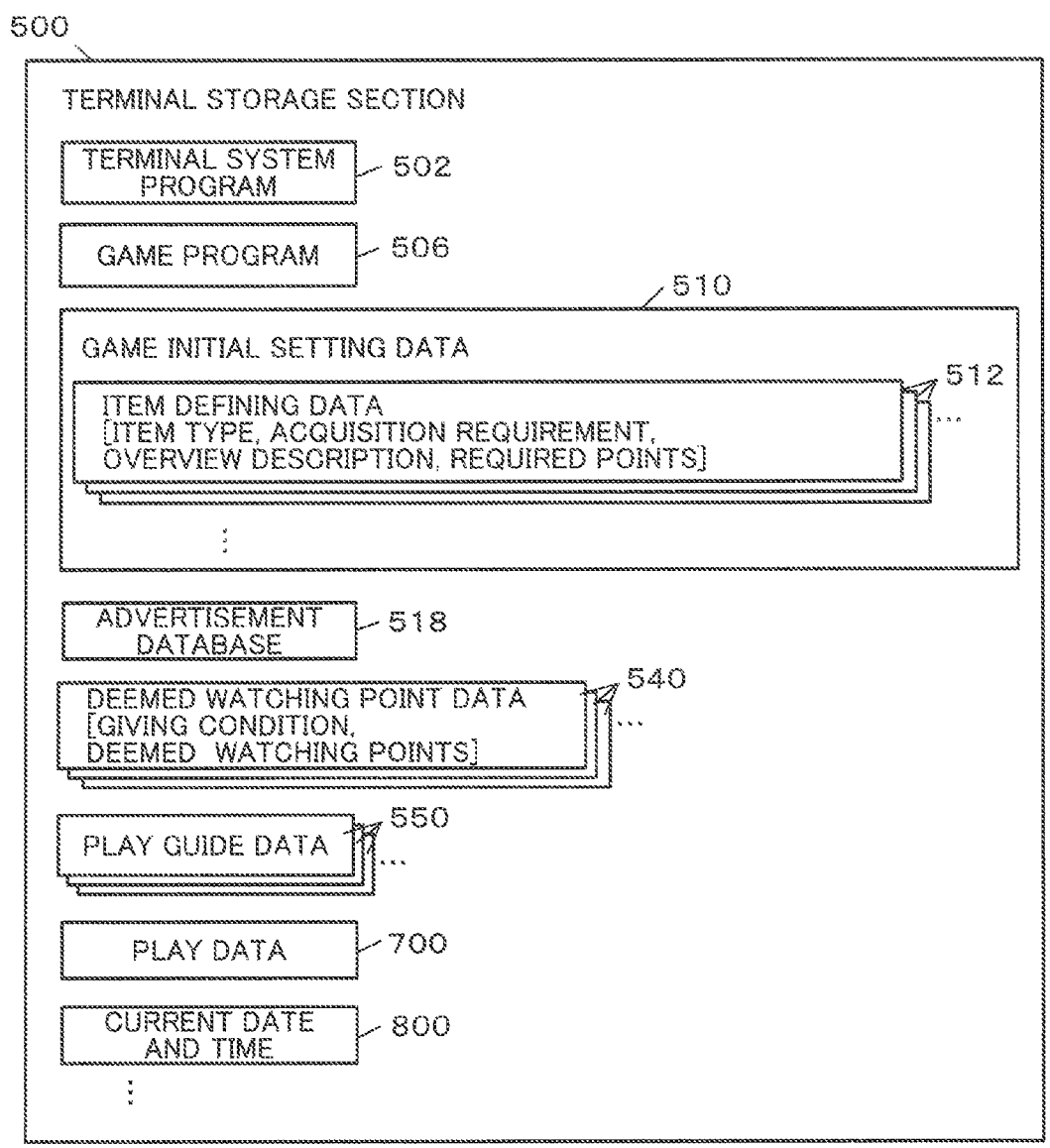
FIG. 27 is a diagram illustrating an example of a program and data stored in a terminal storage section of a user terminal according to the second embodiment.

FIG. 27 is a diagram illustrating an example of a program and data stored in the terminal storage section 500 of the user terminal 1500B according to the present embodiment. The terminal storage section 500 according to the present embodiment stores therein the terminal system program 502 and the game program 506. Thus, as the user terminal 1500B processes the game management section 220, the game initial setting data 510, the advertisement database 518, the deemed watching point setting data 540, the playing guide data 550, and the play data 700 are stored in the terminal storage section 500.

The game program 506 is a program that causes the terminal processing section 200 to implement the user terminal calculation section 270 and the game management section 220 according to the present embodiment.

A flow of the process according to the present embodiment is basically the same as the flow of the process (see FIG. 19 to FIG. 25) performed by the server system 1100 according to the first embodiment. The user terminal 1500B implements the game management section 220, and thus the subject of each step may be changed to the user terminal 1500B as appropriate. When the user terminal 1500B performs a process requiring the user management data 600 to be referred to/changed, the server system 1100 is requested to provide required data, perform matching, or the like or may be requested to perform the entire process as appropriate.

The present embodiment can provide the same advantageous effect as the first embodiment. The user terminal 1500B may be partially in charge of the functions of the game management section 220, instead of being entirely in charge of the functions.

[Modifications]

The embodiments to which the invention is applied have been described above. Note that the invention is not limited thereto. Various modifications may be made as appropriate, such as adding other elements, omitting some of the elements, or changing some of the elements.

[First Modification]

For example, in the example according to the first embodiment, the entire game system is implemented with a client-server system. However, this should not be construed in a limiting sense. For example, a computer system in which a plurality of user terminals 1500 can establish a peer-to-peer (P2P) connection may be implemented for a battle game. Specifically, the server system 1100 provides data as a matching result to the user terminals 1500 matched by the server system 1100, and then the user terminals establish the P2P connection. One of the user terminals 1500 is in charge of the functions of the game management section 220. Alternatively, a plurality of user terminals 1500 may cooperate to implement the functions.

[Second Modification]

The system according to the examples described in the embodiments described above includes the server system 1100 and the plurality of user terminals 1500. Alternatively, the present invention may be similarly applied to a game system including a single computer. For example, the present invention may be applied to a single game device.

Figure 28:
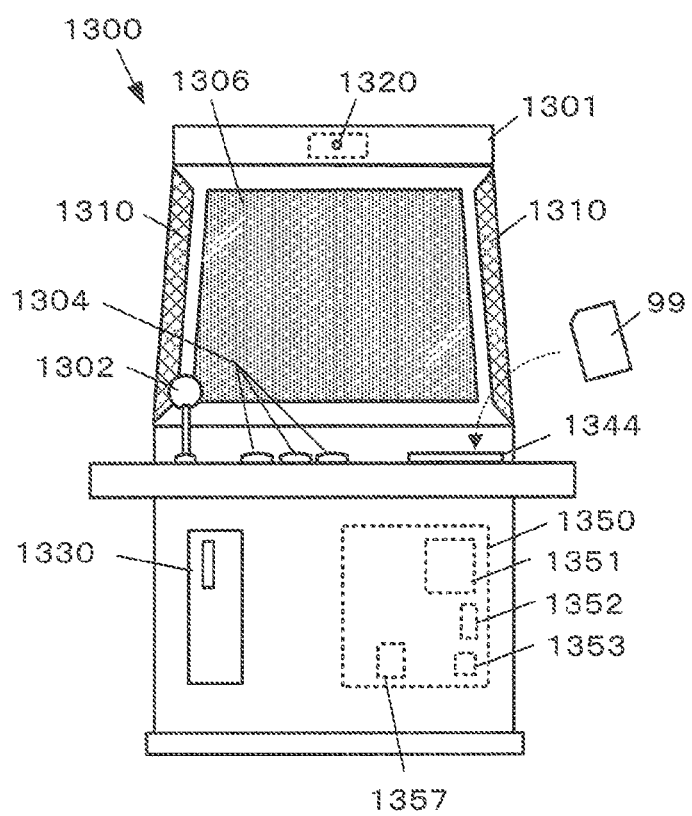
FIG. 28 is an external front view illustrating an example of a configuration of an arcade game device according to another embodiment.

Specifically, FIG. 28 is an outer front view illustrating an example of a configuration of an arcade game device 1300 employing the present invention. The arcade game device 1300 includes a casing main body 1301 provided with operation input units, used by the player to input operations, including: a joystick 1302; a button switch 1304; and a touch panel 1306 that functions as an image display device and as a touch position input device. The casing main body 1301 is further provided with a speaker 1310, a player image capturing camera 1320, a payment device 1330, a medium reading device 1344 for writing and reading data to and from an electronic payment medium 99, and a control board 1350.

The control board 1350 includes various processors (e.g., a CPU 1351, GPU, and A DSP), various IC memories 1352 (e.g., a VRAM, a RAM, and a ROM), a communication device module 1353 for establishing communication connection with the communication line 9, an I/F controller 1357 (interface controller), and the like.

For example, the I/F controller 1357 includes 1) a driver circuit for the touch panel 1306, 2) a circuit that receives a signal from the joystick 1302 and the button switch 1304, 3) an output amplifier circuit that outputs a sound signal to the speaker 1310, 4) a circuit that reads image data on an image captured by the player image capturing camera 1320, 5) a circuit for outputting and receiving a signal to and from the payment device 1330 and the medium reading device 1344, and the like.

The elements mounted on the control board 1350 are electrically connected to each other through a bus circuit or the like so that the elements can exchange data and signals. The control board 1350 may be partially or entirely implemented with an ASIC, an FPGA, or a SoC.

The control board 1350 executes the game program to perform the calculation process, and controls each section of the arcade game device 1300 to enable the gameplay in accordance with an operation input with the joystick 1302, the button switch 1304, and the touch panel 1306. The arcade game device 1300 has a required program and various types of setting data in the IC memory 1352 in advance. Alternatively, the program and the data may be downloaded from an external device each time the system is booted.

The control board 1350 performs control so that the arcade game device 1300 sequentially transmits the result of the operation input using the joystick 1302, the touch panel 1306, or the like to the server system 1100 and receives the various types of data for playing the game from the server system 1100. The image of the game screen is generated and displayed on the touch panel 1306, and the sound signal corresponding to the sound effects and an operation sound is generated and emitted from the speaker 1310. Thus, the player can enjoy the gameplay by operating the joystick 1302 while watching the game screen displayed on the touch panel 1306 and listening to the game sound from the speaker 1310.

In this configuration, the functions of the server system 1100 and the user terminal 1500 according to the first embodiment are implemented with the arcade game device 1300 alone.

Note that the advertisement database 518 and the user management data 600 may be stored in the server system 1100 as in the first embodiment, and data may be acquired and updated with the arcade game device 1300 issuing a request to the server system 1100 each time the acquisition or the updating is required.

[Third Modification]

The advertisement plan in the embodiments described above is not provided with an expiration timing. Note that the expiration timing may be provided. For example, the plan may be automatically aborted/deactivated when a predetermined period of time (for example, one week or 10 days) elapses after the confirmed date and time 633 or the display start date and time 661 (see FIG. 15). In such a case, the total acquired watching points 667 are transferred to the reserved points 670, and a notification indicating that the plan has been aborted/deactivated and that the point has been successfully transferred may be displayed to the player.

[Fourth Modification]

In the embodiment described above, the player can select and set the acquisition target item 10 in the acquisition target options (see FIG. 5). Note that the acquisition target item 10 may not be selectable by the player and may be randomly selected from the acquisition target options.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A computer system comprising: at least one processor or circuit comprising hardware, the at least one processor or circuit programmed to:
   control implementation of a game;
   in case of a predetermined operation on a menu by the player, display a new plan creation screen, and:
      display, in the new plan creation screen, a plurality of predetermined acquisition target options set to be acquirable as an entertainment element usable by the player in the game, and select, responsive to the player, an acquisition target from among the plurality of predetermined acquisition target options;
      set, in the new plan creation screen, responsive to the player, a plan for advertisement watching serving in exchange for the player acquiring the acquisition target which was selected, wherein setting the plan
         (a) includes receiving a selection by the player of a watching environment, among a plurality of different predetermined watching environments which are displayed in the new plan creation screen, for an advertisement wherein different amounts of watching points can be acquired by the player with a same advertisement in different watching environments;
         (b) includes receiving a selection by the player of a plurality of advertisements to be displayed to the player and indicates corresponding amounts of watching points that the player will acquire for watching each of the selected advertisements; (c) indicates total watching points that the player will acquire under the plan for the selected advertisements compared to actually required points required to actually acquire the selected acquisition target;
      update, in the new plan creation screen, the total watching points responsive to the player changing the selected advertisements in the plan;
      during a gameplay of the game by the player:
         perform display control for the advertisement and display the advertisement in the selected watching environment to the player based on the plan; and
         perform control to give the acquisition target to the player based on the plan and a display history of the selected advertisements in the plan.

2. The computer system as defined in claim 1, the setting the acquisition target including setting the acquisition target based on a selection operation by a player of the game.

3. The computer system as defined in claim 2, the setting the acquisition target including:
   selecting and setting options of the acquisition target object to be presented to the player based on a play status of the player; and
   setting the acquisition target based on the selection operation from the presented options of the acquisition target.

4. The computer system as defined in claim 1, the setting the plan including setting the plan based on a selection operation by a player of the game.

5. The computer system as defined in claim 4, the setting the plan including:
   performing control for displaying a setting display screen for the plan;
   calculating watching points given to the player when advertisement displaying is performed based on a plan displayed on the setting display screen, and performing control for displaying the watching points; and
   performing display control for required points associated with the acquisition target.

6. The computer system as defined in claim 1, the setting the plan including setting the plan with a length of displaying time related to one advertisement displaying included in a setting item of the plan.

7. The computer system as defined in claim 1, the setting the plan including setting the plan with an advertisement displayed size included in a setting item of the plan.

8. The computer system as defined in claim 1, the setting the plan including setting the plan with an advertisement displayed timing included in a setting item of the plan.

9. The computer system as defined in claim 1, the setting the plan including setting the plan with an advertisement category for an advertisement target included in a setting item of the plan.

10. The computer system as defined in claim 1, the setting the plan including automatically creating the plan based on play information on the player, and presenting the plan to the player.

11. The computer system as defined in claim 1, further comprising estimating a timing at which the acquisition target is given to the player, when advertisement displaying control is performed based on the plan.

12. The computer system as defined in claim 1, further comprising issuing a recommendation notification for recommending replanning of the plan, based on a display history of the advertisement.

13. An advertisement output control system comprising: a server system that is the computer system as defined in claim 1; and
   a user terminal to which the player inputs an operation,
      the server system and the user terminal being connected to the game system to be capable of performing a communication with each other.

14. A game device connected to a server system managing data on an advertisement to be capable of performing a communication with each other, the game device comprising an operation input section to which the player inputs an operation, the game device being the computer system as defined in claim 1.

* * * * *